(12) United States Patent
Taskin et al.

(10) Patent No.: US 10,917,925 B2
(45) Date of Patent: Feb. 9, 2021

(54) SYSTEM AND METHOD FOR SETTING MESH NETWORKS WITH A GENERIC GATEWAY NODE

(71) Applicant: Airties Kablosuz Iletisim Sanayi Ve Dis Ticaret A.S., Istanbul (TR)

(72) Inventors: Metin Ismail Taskin, Istanbul (TR); Alper Akcan, Istanbul (TR); Muharrem Sarper Gokturk, Istanbul (TR); Bilal Hatipoglu, Istanbul (TR); Can Ilhan, Istanbul (TR); Mustafa Karaca, Istanbul (TR); Devin Mungan, Istanbul (TR)

(73) Assignee: AIRTIES KABLOSUZ ILETISIM SANAYI VE DIS TICARET A.S., Istanbul (TR)

( * ) Notice: Subject to any disclaimer, the term of this patent is extended or adjusted under 35 U.S.C. 154(b) by 0 days.

(21) Appl. No.: 15/875,632

(22) Filed: Jan. 19, 2018

(65) Prior Publication Data

US 2018/0213580 A1    Jul. 26, 2018

Related U.S. Application Data

(60) Provisional application No. 62/448,718, filed on Jan. 20, 2017.

(51) Int. Cl.
*H04W 76/11*    (2018.01)
*H04W 76/19*    (2018.01)
(Continued)

(52) U.S. Cl.
CPC ......... *H04W 76/11* (2018.02); *H04L 12/2856* (2013.01); *H04W 40/125* (2013.01);
(Continued)

(58) Field of Classification Search
CPC ... H04W 76/11; H04W 76/19; H04W 40/125; H04W 48/12; H04W 84/18; H04W 88/16;
(Continued)

(56) References Cited

U.S. PATENT DOCUMENTS 9,119,079 B2    8/2015    Soyak et al.
9,432,990 B2    8/2016    Birlik et al.
(Continued)

FOREIGN PATENT DOCUMENTS

| GB | 2 545 697 | 6/2017 |
| WO | 2016/092121 | 6/2016 |
| WO | 2016/159954 | 10/2016 |

OTHER PUBLICATIONS

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).

(Continued)

*Primary Examiner* — Hardikkumar D Patel
(74) *Attorney, Agent, or Firm* — Volpe Koenig

(57) ABSTRACT

A method for use in a IEEE 802.11 device, comprising: wirelessly connecting, by the device, to a gateway that is part of a wireless local area network (WLAN), the gateway configured to operate as an access point (AP) for the WLAN and bridge the WLAN to the Internet; receiving, by the device from the gateway, an announcement message including a network identifier (NI) of a subnetwork of the WLAN, the subnetwork including the gateway and a first node that is also configured to operate as an AP for the WLAN; transmitting, by the device to the gateway, a request message to join the subnetwork; receiving, by the device from the gateway, a response message including a confidential credential for connecting to the subnetwork; establishing a first (Continued)

connection to the first node based on the confidential credential and the NI and beginning to operate as an AP for the WLAN.

16 Claims, 16 Drawing Sheets

(51) Int. Cl.
*H04W 88/16* (2009.01)
*H04W 40/12* (2009.01)
*H04W 84/18* (2009.01)
*H04L 12/28* (2006.01)
*H04W 48/12* (2009.01)
*H04W 48/20* (2009.01)
*H04W 84/22* (2009.01)
*H04W 84/04* (2009.01)
*H04W 84/12* (2009.01)

(52) U.S. Cl.
CPC ........... *H04W 48/12* (2013.01); *H04W 76/19* (2018.02); *H04W 84/18* (2013.01); *H04W 88/16* (2013.01); *H04W 48/20* (2013.01); *H04W 84/04* (2013.01); *H04W 84/12* (2013.01); *H04W 84/22* (2013.01)

(58) Field of Classification Search
CPC ..... H04W 48/20; H04W 84/04; H04W 84/12; H04W 84/22; H04W 12/06; H04W 72/12; H04W 72/1284; H04W 52/24; H04W 52/365; H04W 52/245; H04W 16/20; H04W 4/20; H04W 40/02; H04W 48/10; H04W 68/02; H04W 72/00; H04W 8/00; H04W 8/005; H04W 72/005; H04W 4/80; H04W 48/18; H04W 4/21; H04W 4/70; H04W 76/02; H04W 68/00; H04W 52/028; H04W 52/0225; H04W 76/12; H04W 76/15; H04L 12/2856; H04L 29/06; H04L 63/08; H04L 1/0006; H04L 12/24; H04L 41/0823; H04L 41/0873; H04L 41/0893; H04L 12/403; H04L 41/083; H04L 43/0876; H04L 67/30; H04L 67/04; H04L 67/16; H04L 67/12; H04B 17/318; H04B 11/00
See application file for complete search history.

(56) References Cited

U.S. PATENT DOCUMENTS

| | | |
|---|---|---|
| 9,479,938 B2 | 10/2016 | Gokturk et al. |
| 2007/0206537 A1 | 9/2007 | Cam-Winget et al. |
| 2008/0112363 A1 | 5/2008 | Rahman et al. |
| 2015/0052357 A1* | 2/2015 | Bahr .................... H04W 12/04 713/168 |
| 2015/0109961 A1* | 4/2015 | Patil ....................... H04W 4/21 370/254 |
| 2015/0373636 A1 | 12/2015 | Karaca et al. |
| 2016/0192203 A1 | 6/2016 | Gokturk et al. |
| 2016/0330675 A1* | 11/2016 | Reitsma ................ H04W 76/15 |
| 2016/0353506 A1* | 12/2016 | HomChaudhuri .... H04W 76/15 |
| 2017/0181178 A1 | 6/2017 | Gokturk et al. |
| 2019/0021106 A1* | 1/2019 | Oteri ................ H04W 72/1284 |

OTHER PUBLICATIONS

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHz, IEEE Std 802.11ac-2013 (Dec. 11, 2013).

Wi-Fi Alliance, "Wi-Fi Simple Configuration Protocol and Usability Best Practices for the Wi-Fi Protected Setup Program," Version 2.0.1 (Apr. 2011).

\* cited by examiner

| SOURCE | DESTINATION | NEXT HOP | INTERFACE | QoS requirement | LOGICALLINK |
|---|---|---|---|---|---|
| Source MAC address | Destination MAC address | Next hop node's MAC address | Wireless Interface | | |
| .:AD:01:17 | .:BC:16:E0 | .:01:45:7A | Wireless5 GHz | BestEffort | Wds0.1 |
| .:AD:01:17 | .:BC:16:E0 | .:13:22:0D | Wireless5 GHz | Video | Wds0.2 |
| .:AA:33:44 | .:BC:16:E0 | .:01:45:7A | Ethernet | - | Eth0.2 |

FIGURE 2B

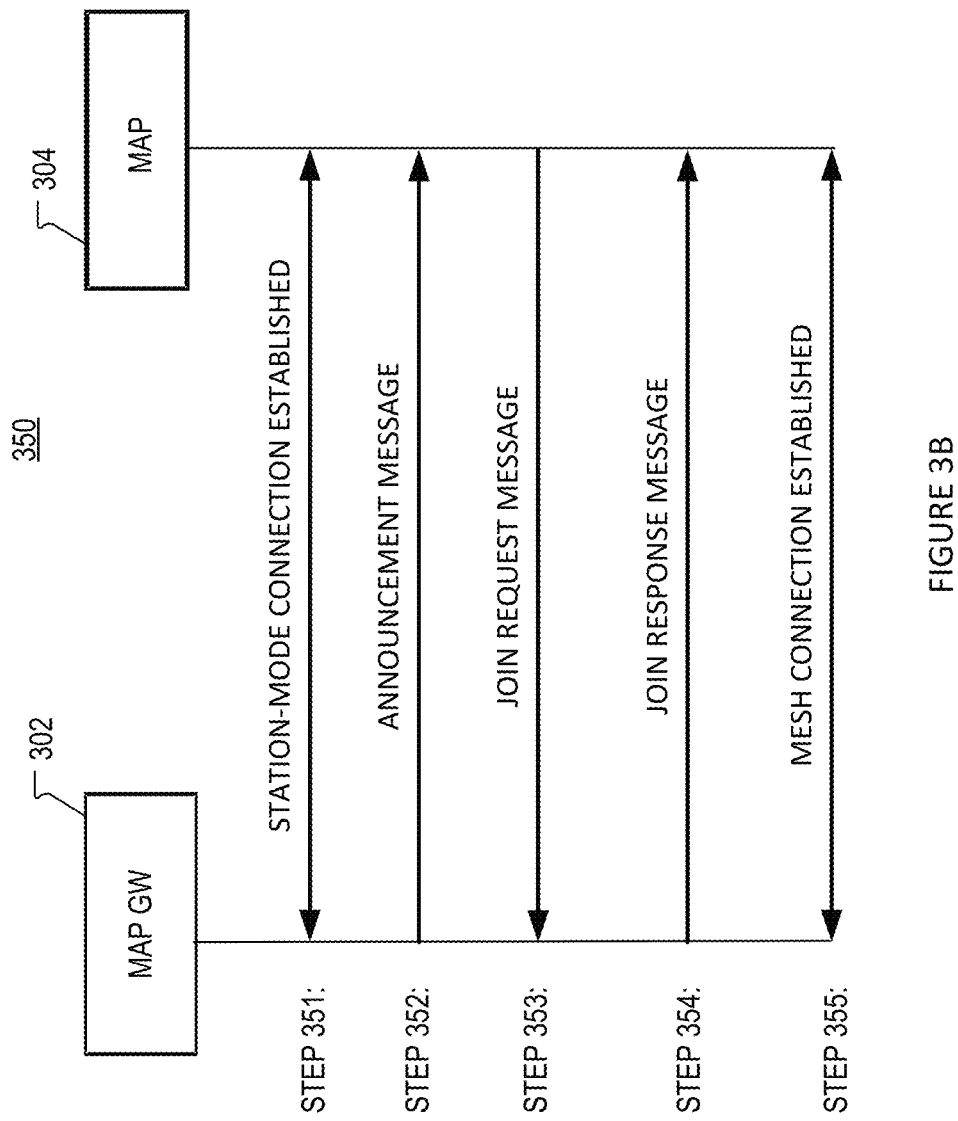

SYSTEM AND METHOD FOR SETTING MESH NETWORKS WITH A GENERIC GATEWAY NODE

CROSS REFERENCE TO RELATED APPLICATIONS

The present application claims the benefit of U.S. Provisional Application 62/448,718, filed Jan. 20, 2017, the contents of which are hereby incorporated by reference.

BACKGROUND

Mesh networks are communication networks where each node can communicate with another node or nodes directly or through other nodes in the network. Hybrid mesh networks are mesh networks in which all or some part of the nodes have more than one interface to communicate with one another, where each interface can utilize a different communication medium.

Wireless networks are usually used to give last hop entry to the network. For example, considering a home network, fiber lines bring the Internet to the home, and the mobile stations (i.e. laptops, desktop computer, Internet appliances, mobile phones, and the like) are connected to the network via wireless access points. Cellular systems are also examples of such networks, where the backhaul infrastructure utilizes high capacity connections between the base stations, low capacity end-user terminals are connected to the access point(s) (AP), or base station(s) (BS) via their wireless interfaces. In such networks, wireless access points can be considered as the entry points for the wireless end-user terminals to access the Internet (or the network itself).

A shortcoming of such a network structure is the limited wireless coverage of both the wireless access point and the end-user terminals. In cellular systems, the area to be covered is divided into cells (hence the name cellular) each of which is separated in the frequency domain, and each cell is connected to other cells through high capacity dedicated wired or wireless connections. In wireless networks where the entry point to the network is provided by Wi-Fi (based on IEEE 802.11 protocols) APs, coverage is limited due to not only the transmit power limits of the APs, but also due to the transmit power limits of the mobile end users.

In a typical home installation, a gateway (GW) device serves as the entry point to the outside world for the end user terminals. A GW device is usually a modem device that is capable of modulating and demodulating signals coming from the landline or fiber optic cables so that the end user can access the Internet. GW devices usually comprise an Ethernet switch and Wi-Fi interfaces. In a typical implementation, the end users connect to the Internet via the wireless interface provided by the gateway device. The gateway device is usually provided, maintained and controlled by the Internet Service Provider (ISP). The ISPs supply the gateway device to their subscribers as part of the Internet service they provide.

The gateway devices supplied by the ISPs are usually armed with the latest wireless technology so that they can keep up with the increasing number of wireless clients in the home, and also, with available capacity offered by the broadband backbone. Note that with the introduction of the IEEE 802.11ac standard, multiple gigabits per second of Wi-Fi communication is possible. The gateway devices are increasingly high capacity devices on both the backbone side and the end user side. However, although the end user side, i.e., the wireless entry to the gateway is improving in terms of the maximum speed that it can deliver, the coverage of these gateway devices is not improving. In fact, the high speeds made possible by IEEE 802.11ac can only be achieved in close vicinity of the gateway device. The users that are further away from the gateway not only suffer but also, they reduce the total available capacity, thus causing the entire wireless network to suffer. Accordingly, the need exists for improved gateway devices and other network nodes that have an extended operation range.

SUMMARY

One possible option for improving network coverage, and also for optimal usage of available wireless medium capacity is to use universal repeaters (UR) together with the gateway device. The URs are devices that have concurrent AP and station (STA) capabilities. A UR connects to a gateway (or an AP) via its STA interface, and provides wireless service to wireless clients through its AP interface. That is to say, from the point of view of the gateway (or the AP) which the UR is connected to, the UR is a station; whereas from the point of view of a wireless station, the UR is an AP to which it can associate with.

Another possible option for improving network coverage is to use mesh access points (MAPs) that are connected in a mesh network together with the gateway. Although MAPs have clear performance advantages over URs, MAPs are still not widely employed in many networks due to the complexity involved in the setup, configuration, and maintenance of the mesh network. In some aspects, mesh networks may be difficult to set up between devices that use different chipset platforms because of differences between protocol stack implementations in different chipset platforms. A need therefore exists for improved mesh network designs and implementations that feature a reduced complexity of setting up connections between nodes that use different chipset platforms.

According to aspects of the disclosure, a method is provided comprising, transmitting, by at least one processor, a first announcement message, the first announcement message being transmitted to a first device; receiving, by the at least one processor, a request message from the first device; transmitting, by the at least one processor, a response message to the first device; establishing, by the at least one processor, a first mesh connection with the first device; receiving, by the at least one processor, one or more messages originating from a station in a local area network, the one or more messages being received from the first device over the first mesh connection, and the one or more messages having a destination outside of the local area network; and forwarding, by the at least one processor, the one or more messages towards the destination that is outside the local area network.

According to aspects of the disclosure, method for use in a IEEE 802.11 device is provided, the method comprising: wirelessly connecting, by the device, to a gateway that is part of a wireless local area network (WLAN), the gateway configured to operate as an access point (AP) for the WLAN and bridge the WLAN to the Internet; receiving, by the device from the gateway, an announcement message including a network identifier (NI) of a subnetwork of the WLAN, the subnetwork including the gateway and a first node that is also configured to operate as an AP for the WLAN; transmitting, by the device to the gateway, a request message to join the subnetwork; receiving, by the device from the gateway, a response message including a confidential credential for connecting to the subnetwork; establishing a first connection to the first node based on the confidential credential and the NI and beginning to operate as an AP for the WLAN, the first connection being a one-hop data-link layer connection; receiving, by the device, data originating from a station (STA) that is connected to the WLAN via the device, the data having a destination outside of the WLAN; and forwarding, by the device, the data to the first node for transmission towards the gateway and the destination that is outside of the WLAN.

According to aspects of the disclosure, an apparatus is provided, comprising: a transmitter; a receiver, and a processing circuitry operatively coupled the transmitter and the receiver, wherein: the receiver is configured to receive an announcement message from a gateway device that is arranged to operate as an access point (AP) for a wireless local area network (WLAN) and bridge the WLAN to the Internet, the announcement message including a network identifier (NI) of a subnetwork of the WLAN, the subnetwork including the gateway device and a first node that is also configured to operate as an AP for the WLAN, the transmitter is configured to transmit to the gateway device, a request message to join the subnetwork, the receiver is further configured to receive from the gateway device, a response message including a confidential credential for connecting to the subnetwork, the processing circuitry is configured to establish a first connection to the first node based on the confidential credential and the NI and begin to operate as an AP for the WLAN, the first connection being a one-hop data-link layer connection, the receiver is further configured to receive data originating from a station (STA) that is connected to the WLAN via the apparatus, the data having a destination outside of the WLAN, and the transmitter is further configured to transmit the data to the first node for transmission towards the gateway device and the destination that is outside of the WLAN.

BRIEF DESCRIPTION OF THE DRAWINGS

The drawings described below are for illustration purposes only. The drawings are not intended to limit the scope of the present disclosure. Like reference characters shown in the figures designate the same parts in the various implementations.

FIG. 2B depicts an example of a forwarding rule employed by a mesh routing subprocessor, according to aspects of the disclosure;

FIG. 3B is a sequence diagram of a process, according to aspects of the disclosure;

DETAILED DESCRIPTION

According to aspects of the disclosure, an improved mesh capable access point (MAP) is disclosed. Furthermore, a mesh processor capable of introducing mesh capability to generic gateway devices is disclosed. The mesh processor may be implemented in hardware (for example, by using hardwired logic), in software (for example, by using one or more processor executable instructions), and/or as a combination of hardware and software. When this mesh processor is executed by a generic wireless gateway device, the generic gateway device is turned into a MAP-enabled gateway which possesses a mesh capability and is capable of connecting to other MAPs to form a mesh network. From the point of view of the end user, the network may appear to be composed of a single access point (AP), whereas the actual network can comprise multiple APs (for example, one or more MAPs and a MAP-enabled GW node). The network may be advantageous over networks that use universal repeaters (URs) to increase range, as it may have fewer bottlenecks and an increased data throughput.

Figure 1A:
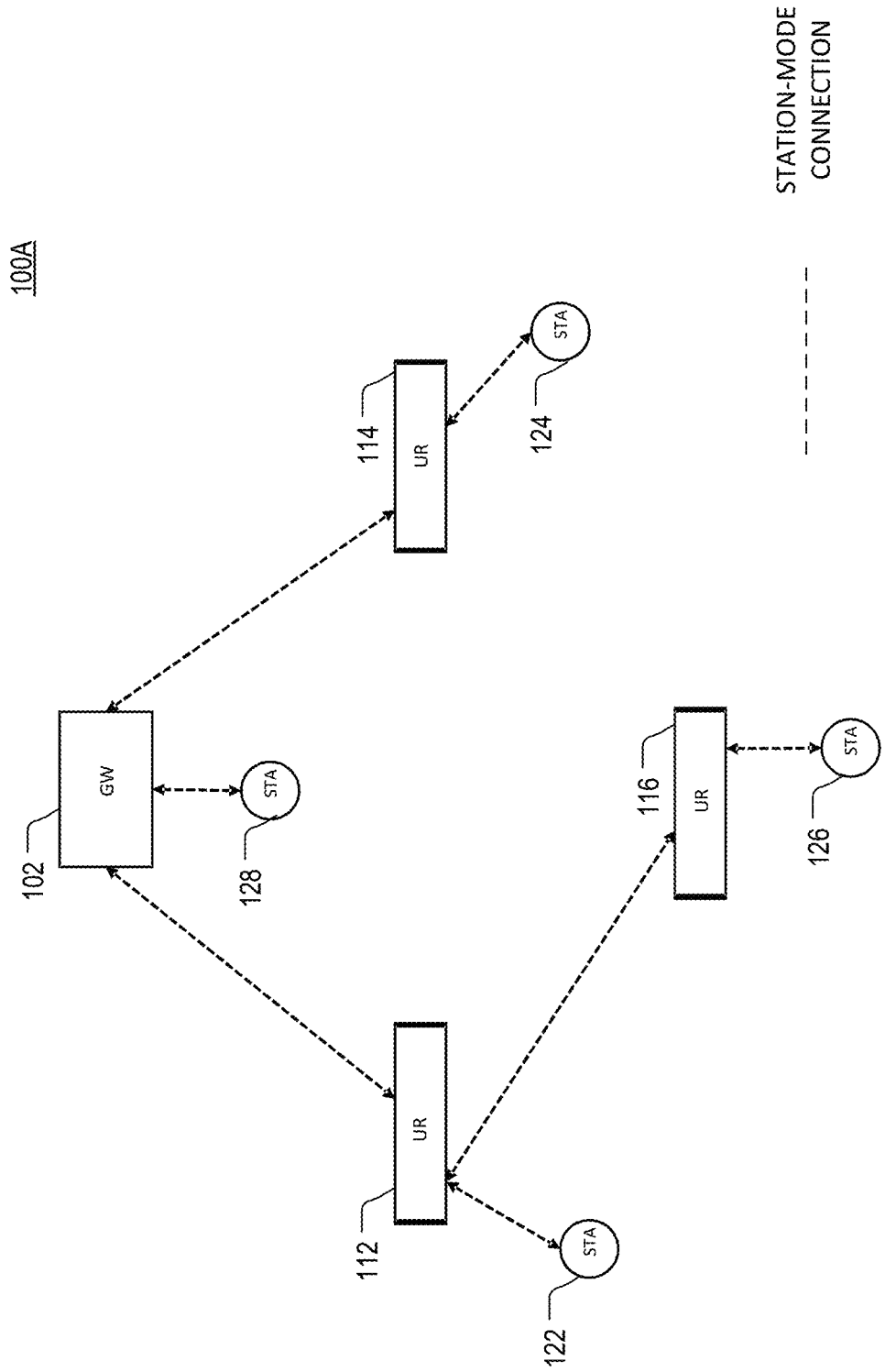
FIG. 1A is a diagram of an example of a network, according to aspects of the disclosure.

FIG. 1A is a diagram of an example of a communications network 100A which uses universal repeaters to extend network range, according to aspects of the disclosure. The communications network 100A includes a gateway (GW) 102 and universal repeaters (URs) 112-116 which are used to extend the range of GW 102. The network 100A is organized in accordance with a tree topology, in which GW 102 is the root and URs 112-116 are parent nodes for stations (STAs) 122-128. More particularly, URs 112 and 114 and STA 128 are connected directly to GW 102. Furthermore, STA 122 is connected to GW 102 via UR 112, UR 116 is connected to GW 102, via UR 112, STA 124 is connected to GW 102 via UR 114, and STA 126 is connected to GW 102 via UR 116 and UR 116. As a result of this arrangement, all outgoing traffic from STAs 122-128 has to traverse through GW 102, which may result in a lower end-to-end throughput.

In some applications, URs are not the best option for extending the range of wireless GWs. For example, consider a case where two URs are connected to a GW directly. Furthermore, consider a mobile station that is connected to one of the URs, and that is trying to stream video provided by a digital video recorder (DVR) which is connected to the other UR. In such a topology, the packets must pass through the gateway since the URs do not have a direct connection between them, although they may be in a close proximity to each other that would allow direct communication (for example, with reference to FIG. 1A, UR 116 cannot directly communicate with UR 114, and must instead communicate via UR 112 and GW 102). This limitation, the lack of direct communication capability between URs, is inherent in the operation of URs.

Figure 1B:
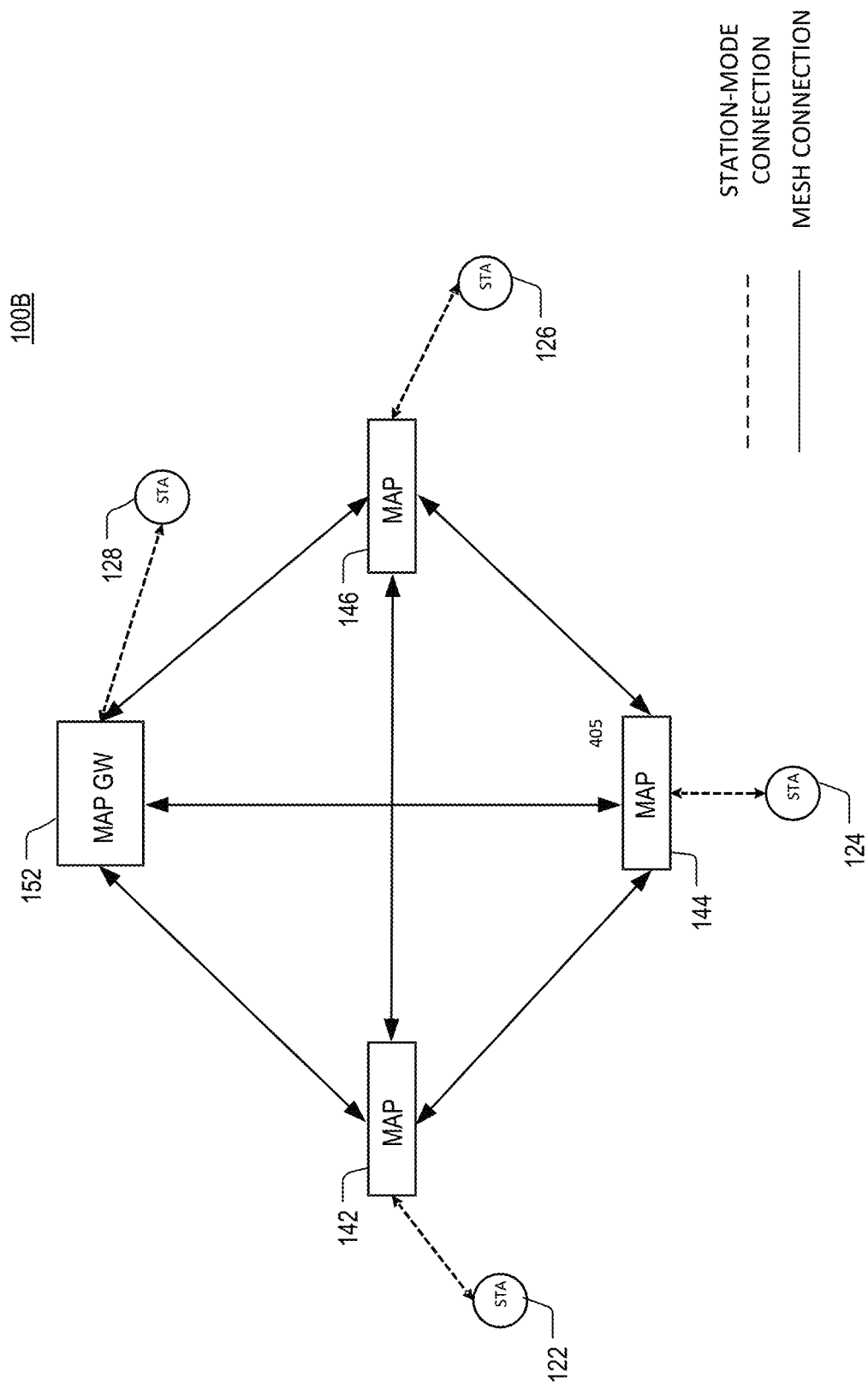
FIG. 1B is a diagram of an example of a network, according to aspects of the disclosure.

FIG. 1B is a diagram of an example of a communications network 100B, in which mesh capable access points (MAPs) are used to extend the network range instead of URs, according to aspects of the disclosure. MAPs are advantageous over URs as MAPs are capable of forming wireless connections among each MAP, which results in an improved data throughput for the network 100B. The network 100B includes MAPs 142-148, and a mesh capable access point gateway (MAP GW) 152. As illustrated in FIG. 1B, MAPs 142-148 have active connections among each other. These connections are herein referred to as "mesh connections." The MAPs 142-148 are capable of utilizing these mesh connections for shortest path packet routing without the need to always traverse GW 152 for communications between different MAPs in the communications network 100B. It should be noted that the routing discussed here is data link layer, i.e., layer 2, routing, and it should not be confused with network layer routing.

Figure 2A:
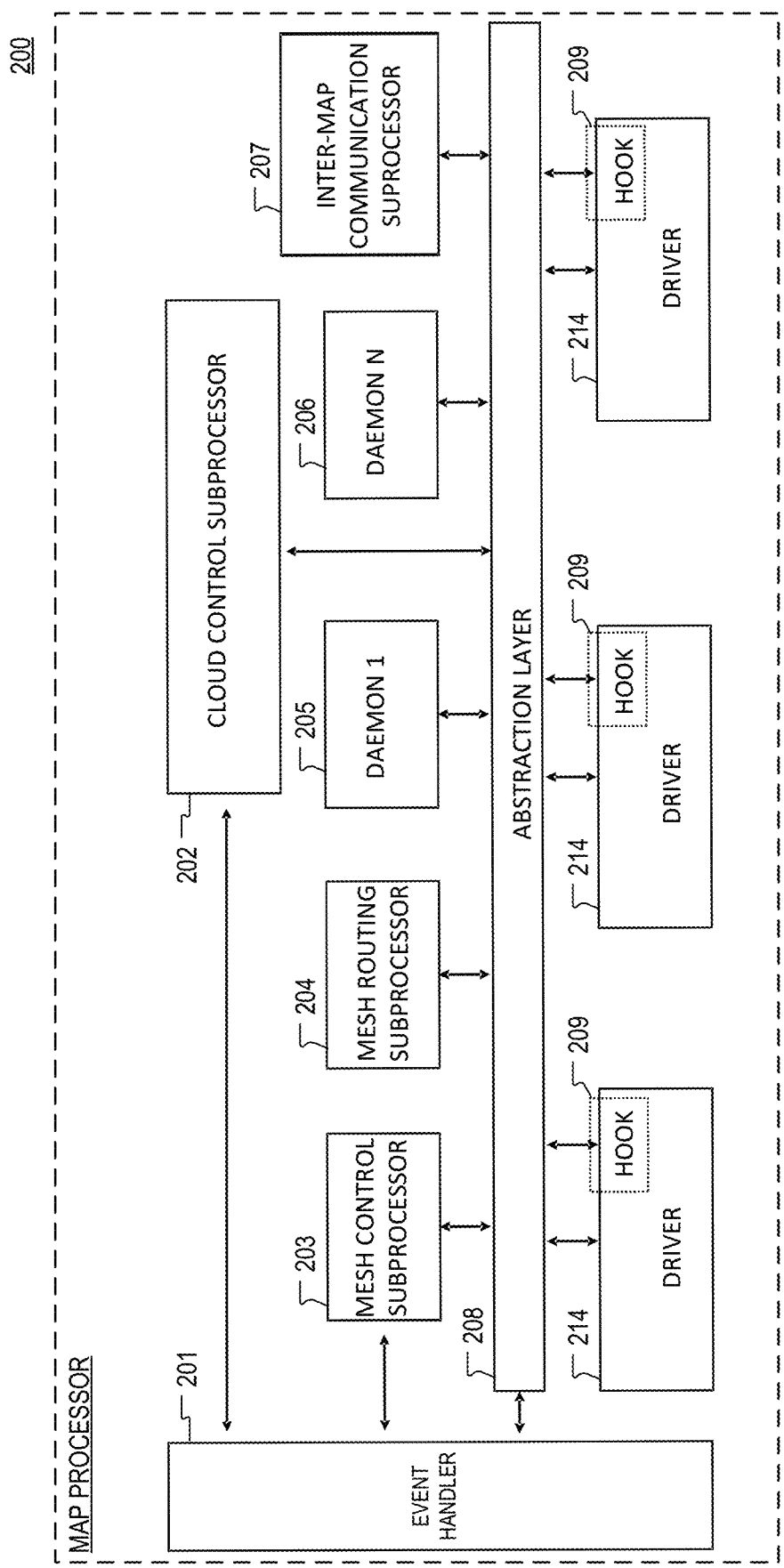
FIG. 2A is a diagram of an example of a mesh capable access point (MAP) module, according to aspects of the disclosure.

FIG. 2A is a diagram of an example of a mesh processor 200, according to the aspects of the disclosure. The mesh processor 200 may be implemented as software, hardware, and/or a combination of software and hardware. The mesh processor may be implemented in a remote server and may send its commands from the remote server to the MAP device via a communications interface. The mesh processor 200 may be integrated into a generic gateway and/or a wireless station (for example, a wireless client). When the mesh processor 200 is integrated into a generic gateway, that gateway may turn into a MAP gateway.

In some implementations, mesh processor 200 may include one or more of event handler 201, mesh control subprocessor 203, mesh routing subprocessor 204, customized daemons 205-206, inter-MAP communication subprocessor 207, abstraction layer 208, and interface-specific drivers 214. Mesh control subprocessor 203 is responsible for the setup and maintenance of the mesh network. Mesh routing subprocessor 204 is responsible for the packet routing in the data-link layer. The mesh processor 200 may run several customized daemons, such as daemons 205, 206. A daemon is a software program that runs as a background process, rather than being under the direct control of an interactive user. Customized daemons 205, 206 may be run in separate subprocessors, or more generally may be run by mesh processor 200. In one implementation, a client steering daemon may be implemented as a customized subprocessor. Furthermore, a dynamic channel selection daemon may be employed as a customized subprocessor. Event handler 201 binds the events and commands generated by the subprocessors, such as the mesh control subprocessor 203, mesh routing subprocessor 204, and the customized daemons, if any, with the interface-specific drivers through the abstraction layer 208. Likewise, events generated by the interface-specific drivers 214 are delivered to the subprocessors 202-207 through the event handler 201 via the abstraction layer 208. In another implementation, the event handler 201 can bind the commands and events between the subprocessors 202-207 and the interface-specific drivers 214 without the use of an abstraction layer 208. Abstraction layer 208 provides a common messaging platform between the interface-specific drivers 214 and the subprocessors 202-207. Examples of interface-specific drivers are IEEE 802.11 based physical layer wireless air interface drivers (for example, 2.4 GHz wireless driver, 5 GHz wireless driver), power line communication (PLC) driver, multiplexing over coaxial (MoCA) driver, Ethernet driver, etc. Driver hooks 209 are control points within the driver code that enable dynamic (on-the-fly) changes in the operation of the code in accordance with the external input. Furthermore, driver hooks 209 are monitor points within the driver code that facilitate monitoring the state of various variables during run time. The subprocessors described above can be implemented as distinct structural processors or components, or more likely, as software routines running on mesh processor 200 in the gateway device.

To illustrate the above further, consider the wireless protected setup (WPS) events in the 5 GHz WiFi wireless interface. Typically, the command associated with the WPS procedure is start, and the events associated with the WPS procedure are (1) timeout, (2) success, and (3) fail. Mesh control subprocessor 203 may trigger the WPS start command in the 5 GHz wireless driver through the abstraction layer 208. Furthermore, mesh control subprocessor 203 can monitor the timeout, success, and/or fail events of the respective wireless interface through the event handler 210 and the abstraction layer 208.

An event/command may trigger multiple combined events/commands, or an event/command may trigger sequential events/commands, or an event/command may trigger multiple parallel events/commands. Furthermore, a command may incorporate a set of instructions to be carried out by the recipient of the command. For example, a WPS-start-PIN command includes (1) an interface name of the basic service set (BSS), for example, 2.4 GHz wireless interface, (2) a BSSID (MAC address of the node with which WPS is to be carried out), and (3) a PIN (personal identification number). WPS-start-PIN command initiated by the mesh control subprocessor 203 notifies a wireless driver via the abstraction layer 208 that a WPS command is to be triggered on the wireless driver with the provided BSSID using the provided PIN. The wireless driver initiates the WPS command and informs the mesh control subprocessor 203 about the outcome (timeout, success, or fail) again via the abstraction layer 208 and the event handler 210.

For further illustration, consider a client steering daemon communicating with a 2.4 GHz wireless interface driver. Client steering daemon may request the current receive signal strength indicator (RSSI) of a specific client. For this, client steering daemon generates a "get client RSSI" command, with various information in the payload of the command. Typical information in the payload includes the MAC address of the client, number of measurement samples being requested, and periodicity of the measurements. For example, client steering daemon may generate a "get client RSSI" command for a client for RSSI measurements to be taken within 1 minute with a frequency of 10 seconds. A respective function in the abstraction layer 208 is called, through which the driver hooks are called. Note that a driver hook is a function which can be called externally through the abstraction layer 208, and which returns the output to the event handler through the abstraction layer 208.

Cloud control subprocessor 202 is capable of receiving instructions from a remote server, forwarding these instructions to respective subprocessors and daemons in the mesh processor 200, and pushing logs (which are acquired from the respective subprocessors and daemons) back to the remote server. Cloud control subprocessor 202 may be used to customize the operation of the subprocessors, for example, the mesh control subprocessor 203, mesh routing subprocessor 204, and various customized subprocessors. To better illustrate the use of the cloud control subprocessor 202, consider the following example: cloud control subprocessor 202 receives the client authentication request events from the wireless interface together with the received signal strength indicator (RSSI) information from the respective driver hook through the abstraction layer 208 and the event handler 201. Moreover, the cloud control subprocessor 202 receives the RSSI information of each associated client from the respective driver hook through the abstraction layer 208, or through a customized daemon, such as client steering daemon, with the MAC address of the respective client, and the timestamp of the measurement. The cloud control subprocessor 202 sends this information to a cloud server. The cloud control subprocessor 202 may either push this information when it is created, or it may wait for a predetermined period of time before it pushes this information together with other information gathered during this period (it may send a bundle of information), or it may wait for the request of the remote cloud server, in response to which it provides this information to the cloud server.

The remote cloud server collects information from multiple GWs, APs, and homes. Hence, the remote cloud server is capable of carrying out complex analysis on the collected data, which may be dispersed to several days or months or even years, and several clients (on the order of millions or higher). The details of the actions taken by the remote cloud server is out of the scope of this disclosure. However, cloud control subprocessor 202 is compatible with the cloud control server such that the commands issued by the cloud server are intelligible by the cloud control subprocessor 202, and likewise, the logs/information provided by the cloud control subprocessor 202 are intelligible by the cloud server.

In an example implementation, the cloud server instructs the cloud control subprocessor 202 to change the frequency of data collection for a specific client in the mesh network, or for all clients in the network. Furthermore, the cloud server instructs the cloud control subprocessor 202 to instruct the client steering daemon to exempt a specific client (STA) from the actions of client steering daemon (i.e. disable steering only for that specific STA). Or, the cloud server may instruct the cloud control subprocessor 202 to instruct the client steering daemon to use a different set of parameters (which control the behavior of the client steering daemon) when performing steering decisions.

In essence, the remote cloud server is capable of controlling the behavior of all subprocessors, and daemons, and in effect the behavior of the GW and/or the APs, resulting in total control of the network by utilizing the cloud control subprocessor 202. For that to be realized, remote cloud server and the cloud control subprocessor 202 are required to know the capabilities (and features) of the subprocessors and the daemons running on the mesh processor 200 so that the cloud server may communicate with and instruct them as desired.

In one implementation, subprocessors and daemons residing in the mesh processor 200 may be upgraded individually. For example, additional capabilities can be introduced to, say mesh routing subprocessor 204, or the client steering daemon, without the need for upgrading the entire firmware or the firmware.

In one implementation, subprocessors and daemons that reside in the mesh processor 200 can communicate with the other subprocessors and daemons residing in another mesh processor 200, in another MAP, via the inter-MAP communication subprocessor 207. A subprocessor in a MAP may utilize its specific communication protocol to communicate with the respective subprocessor in another MAP. However, the inter-MAP communication subprocessor 207 provides a unified and all-purpose inter-MAP communication platform for any subprocessor residing in the MAP. A subprocessor can communicate with the inter-MAP communication subprocessor 207 through the abstraction layer 208. A subprocessor subscribes to the inter-MAP communication subprocessor 207 for delivery and reception of its messages in terms of payloads. For example, a subprocessor passes its messages in chunks of payloads to the inter-MAP communication subprocessor 207 for delivery to a specific node or nodes in the network, and the subprocessor requests from the inter-MAP communication subprocessor 207 to forward any payload addressed to itself.

Inter-MAP communication subprocessor 207 may employ various encryption methods; hence the subprocessors and daemons attached to it do not need to employ their own encryption method, or they can utilize the encryption provided by this subprocessor for extra protection. Inter-MAP communication subprocessor 207, at the transmitting side fragments payloads into multiple smaller payloads in case they exceed the maximum transmit payload allowed by the transmission medium, and also at the receiving side it defragments the payloads to form the original payload. Inter-MAP communication subprocessor 207 may utilize positive acknowledgment based message delivery; in that unacknowledged messages are retransmitted for a certain number of times, until they are acknowledged or until a maximum number of retransmissions are reached.

Inter-MAP communication subprocessor 207 relieves the subprocessors and daemons from implementing their own messaging platforms. However, the inclusion of the inter-MAP communication subprocessor 207 in the mesh processor 200 does not mandate the other subprocessors employ the inter-MAP communication subprocessor 207 for their own communication. The other subprocessors may utilize their own communication protocols to communicate with the respective subprocessors in other GWs and/or MAPs. Hence, in the remainder of this document, where it is mentioned that a subprocessor or a daemon communicates with another subprocessor or daemon residing in another MAP by sending/receiving a message, this may be interpreted in two possible ways. First, the communication between the subprocessors/daemons of different MAPs is taking place through the use of the inter-MAP communication subprocessor. Second, the communication between the subprocessors/daemons of different MAPs without the use of the inter-MAP communication subprocessor, and instead the communication is direct between the respective subprocessors/daemons via their own communication protocol.

Data-link layer packet routing in the mesh network is handled by the mesh routing subprocessor 204 residing within the mesh processor 200. Mesh routing subprocessor 204 implements methods to determine the best routes to each node in the network. Based on the discovered routes, mesh routing subprocessor 204 designates forwarding rules for incoming and outgoing packets. In one implementation, mesh routing subprocessor 204 implements periodic or on-demand route discovery mechanisms to determine a cost of packet delivery among the nodes. In one embodiment, the path discovery makes use of cost of individual connections on a path from a source node to a destination node to compute the end-to-end cost.

Mesh routing subprocessor 204 implements methods to assess the quality of the connections between node pairs. These methods may make use of the following parameters to assess the quality of a connection: packet error rate (PER), achievable physical rate, achievable modulation and coding scheme (MCS), RSSI, delay, jitter, and the like. The assessed quality is denoted in terms of a cost metric. The cost metric can be a function of various quality parameters. In one implementation, the cost metric can be inversely proportional to the achievable physical rate, thus as the achievable physical rate on a connection is increased the cost of using that connection is reduced.

Mesh routing subprocessor 204 generates connection-monitor commands to learn the status of a connection. Connection-monitor commands may be periodic or on-demand. Connection-monitor commands prompt the driver to return the current connection quality metric on the queried interface with the queried receiver. For example, a connection-monitor command may ask the 5 GHz wireless driver to return the physical rate of the last data packet (the acknowledgement for which is received) sent on the wds0.1 connection (see FIG. 2B). Note that the wds0.1 connection designates a specific receiving node attached to 5 GHz wireless interface. Hence, the connection quality of wds0.1 is nothing but the quality of communicating with the respective node connected on the 5 GHz wireless interface. As described before, connection-monitor command may incorporate a payload that specifies to the driver which type of information is being asking for. For example, the payload may include RSSI, physical rate, PER observed on a connection.

Mesh routing subprocessor 204 makes use of individual connection costs to determine end-to-end path costs. The end-to-end path may be determined by an on-demand type route discovery protocol, such as AODV (ad hoc on demand distance vector routing), that computes the path costs as the route discovery and route response messages are exchanged between the source and the destination node via the intermediate nodes. The end-to-end path may also be determined by a centralized method, where the connection cost metric information of the entire network is collected at every node, or at one master node, which calculates shortest paths for each possible source-destination pair in the network. Based on the determined routes, the mesh routing subprocessor 204 defines the interfaces to utilize for different packet flows. For example, if the shortest path between the GW and the MAP2 is through MAP1, where the GW-MAP1 connection is Ethernet (eth0.1) and the MAP1-MAP2 connection is 5 GHz wireless (over wds0.1), the mesh routing subprocessor 204 on MAP1 defines that the packets coming from MAP2 destined to GW are delivered on wds0.1, and they are to be forwarded to the eth0.1.

The mesh routing subprocessor 204 sets the packet forwarding rules in the interface-specific drivers. In one implementation, a packet forwarding rule may be given in terms of the source MAC address, destination MAC address, and the next hop node's MAC address, and the interface or interfaces to use for packet forwarding, which is to be interpreted as: a packet originated from the source for delivery to the destination shall be forwarded to the next hop node on the specified interface or interfaces. In another implementation, the forwarding rule may specify only the destination's and the next hop node's MAC addresses, and an interface. In further implementations, packet forwarding rules may incorporate flow and quality of service (QoS) based metrics to differentiate and route different flows on different paths.

For example, the forwarding rule may specify that packets originating from node A, destined to node Z, shall be forwarded to node F, via the wireless 5 GHz interface. The forwarding rule may specify further details, such as packets originating from node A with Video tag, destined to node Z, shall be forwarded to node K via the Ethernet interface, and the packets originating from node A with Best Effort tag, destined to node Z shall be forwarded to node Y via the wireless 5 GHz interface. The forwarding rule may specify further details, such as constraints on delay requirements of packets, etc.

The mesh routing subprocessor 204 sets the forwarding rules to the interface-specific drivers. For example, in one implementation, if the forwarding rule specifies that if a packet is destined to node D it shall be forwarded to node E on the wireless 5 GHz interface, then the mesh routing subprocessor 204 programs the wireless 5 GHz interface's driver to forward packets destined to node D to the WDS connection associated with node E.

FIG. 2B depicts an example of a forwarding rule employed by the mesh routing subprocessor 204. Note that forwarding rule may specify the destination, the next hop node and the interface. The amount of details that may be specified in the forwarding rule partly depends on the driver capability, because the driver may also implement its own forwarding table. For example, if the driver expects destination MAC address information to check on which logical connection to forward the packets to, then the mesh routing subprocessor 204 cannot dictate the driver to differentiate between sources that try to send packets to the same destination node, because the driver does not implement a method to differentiate source address.

Packet routing subprocessor updates the forwarding rules as new connections are established among the nodes. For example, if an Ethernet connection is enabled between two MAPs, an interface up event is generated by the Ethernet interface of each MAP. This Ethernet up event is delivered to the mesh control subprocessor 203 and the mesh routing subprocessor 204 via the abstraction layer 208. The mesh control subprocessor 203 begins utilizing the newly available Ethernet interface for mesh announcement messages, join-request/join-response messages, configuration-request/configuration-response messages, etc.; the mesh routing subprocessor 204 starts path discovery for each mesh-peer. In some aspects, with the newly available Ethernet connection possible path alternatives may be increased.

In case a MAP node is turned off, the connections terminating at and originating at that MAP node are broken. In such cases, the mesh routing subprocessors 204 of the neighboring MAPs identify the broken connections and update the cost metric to infinity (or to the highest cost that can be assigned to a connection) for a respective broken connection. As the cost of using the broken connection goes to infinity, the used shortest path discovery method never selects paths that pass through the broken connection(s). As a result of the updated connection metrics, new shortest paths that avoid the broken connection(s) are found, and consequently the forwarding rules are updated accordingly.

Furthermore, when a MAP node is turned off, although it's removed from the forwarding rules of other nodes in the mesh network, the MAP is still kept in the mesh-peer list. The GW node keeps announcing the turned off MAP in its mesh-peer list (WDS-peer list). Hence, if a new MAP is added to the mesh network while the aforementioned MAP is powered off, the new MAP adds the powered off MAP in its mesh-peer list. When the powered off MAP is turned back on, it connects to the GW or a MAP in STA mode, obtains the configuration that also includes the mesh-peer list, switches to AP mode, and establishes mesh connections with the nodes in the mesh-peer list.

In certain implementations, mesh control subprocessor 203 can control in which wireless channel the mesh network operates. Mesh control subprocessor 203 can request channel availability measurements in any wireless channel, in terms of airtime statistics, interference statistics, from the wireless drivers. In some implementations, the mesh control subprocessor 203 of a first device may request the same measurements from the mesh control subprocessor 203 of a second device, as well. This request can be carried out through the inter-MAP communication subprocessor 207 of the first device. Based on the provided results, the mesh control subprocessor 203 of the first device, can select another operating Wi-Fi channel (frequency) for the network.

Figure 2D:
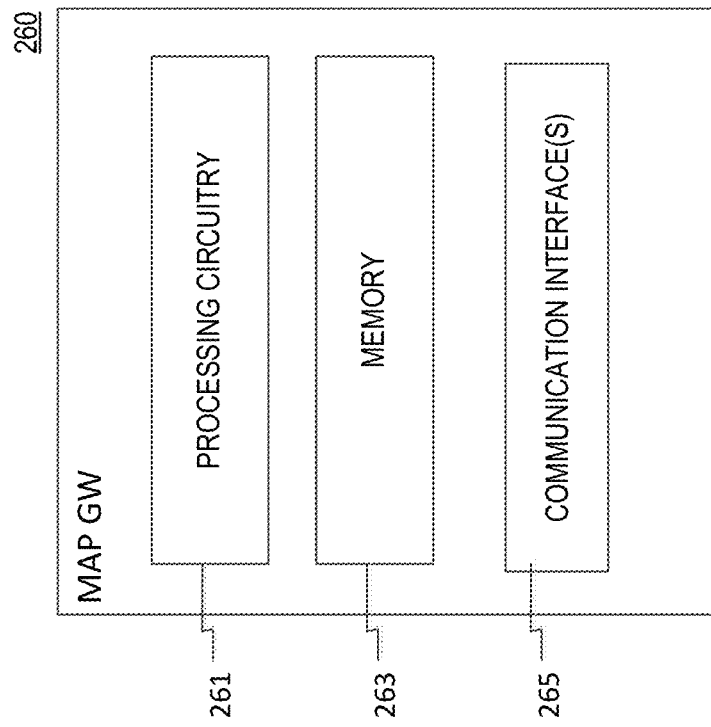
FIG. 2D is a diagram of an example of an access point incorporating the MAP module of FIG. 2A, according to aspects of the disclosure.
Figure 2C:
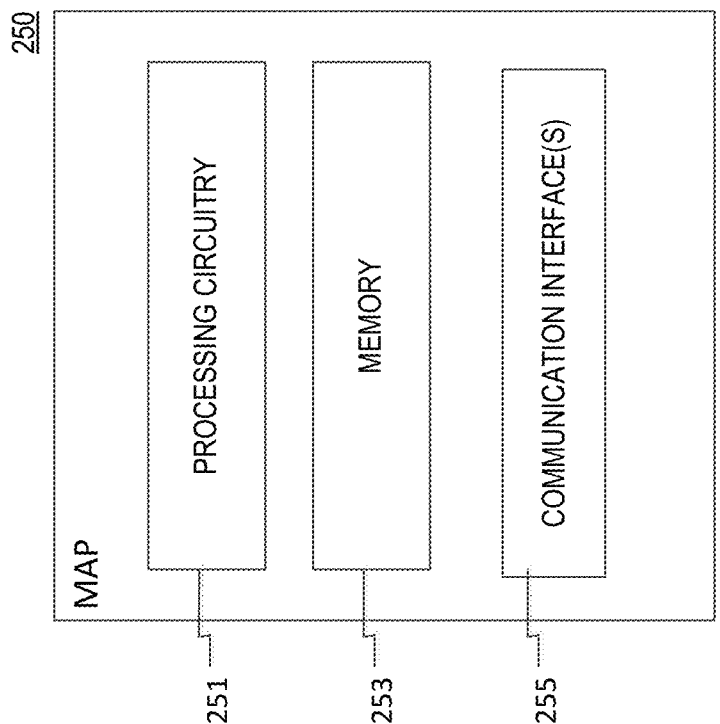
FIG. 2C is a diagram of an example of a mesh capable access point gateway (MAP GW) incorporating the MAP module of FIG. 2A, according to aspects of the disclosure.

FIG. 2C is a diagram of an example of MAP 250, according to aspects of the disclosure. As illustrated, MAP 250 includes processing circuitry 251, a memory 253, and communication interface(s) 255. According to aspects of the disclosure, processing circuitry 251 may include any suitable type of processing circuitry. For example, processing circuitry 251 may include one or more of a general-purpose processor (for example, an ARM-based processor), a chipset of a communications interface, an application-specific integrated circuit (ASIC), and a Field-Programmable Gate Array (FPGA). Memory 253 may include any suitable type of volatile and non-volatile memory, such as random-access memory (RAM), read-only memory (ROM), flash memory, cloud storage, or network accessible storage (NAS), etc. Communications interfaces 255 may include any suitable type of communications interface, such as a Wi-Fi interface, an Ethernet interface, a Long-Term Evolution (LTE) interface, a Bluetooth Interface, an Infrared interface, a Power Line Communication (PLC) interface, a Multiplexing over Coaxial (MoCA) interface, etc.

According to aspects of the disclosure, MAP 250 may incorporate an instance of the mesh processor 200 discussed above with respect to FIGS. 2A-B. The instance of the mesh processor 200 in MAP 250 may be implemented in hardware (for example, by using hardwired logic), in software (for example, by using one or more processor executable instructions), and/or as a combination of hardware and software.

FIG. 2D is a diagram of an example of MAP GW 260, according to aspects of the disclosure. As illustrated, MAP GW 260 includes processing circuitry 261, a memory 263, and communication interface(s) 265. According to aspects of the disclosure, processing circuitry 261 may include any suitable type of processing circuitry. For example, processing circuitry 261 may include one or more of a general-purpose processor (for example, an ARM-based processor), a chipset of a communications interface, an application-specific integrated circuit (ASIC), and a Field-Programmable Gate Array (FPGA). Memory 263 may include any suitable type of volatile and non-volatile memory, such as random-access memory (RAM), read-only memory (ROM), flash memory, cloud storage, or network accessible storage (NAS), etc. Communications interfaces 265 may include any suitable type of communications interface, such as a Wi-Fi interface, an Ethernet interface, a Long-Term Evolution (LTE) interface, a Bluetooth Interface, an Infrared interface, a Power Line Communication (PLC) interface, a Multiplexing over Coaxial (MoCA) interface, etc.

According to aspects of the disclosure, MAP GW 260 may incorporate an instance of the mesh processor 200 discussed above with respect to FIGS. 2A-B. The instance of the mesh processor 200 in MAP GW 260 may be implemented in hardware (for example, by using hardwired logic), in software (for example, by using one or more processor executable instructions), and/or as a combination of hardware and software.

The operation of MAP 250 and MAP GW 260 is now described in further detail. More particularly, in operation, MAP GW 260 sends "mesh announcement" messages periodically. In a typical implementation, the period of this announcement is 1 second. These messages are broadcasted in the data-link layer through all available interfaces of the MAP GW 260. For example, if MAP GW 260 comprises PLC, Ethernet, 2.4 GHz Wi-Fi and 5 GHz Wi-Fi interfaces, it broadcasts the "mesh announcement" message through every one of these interfaces. In further implementations, MAP GW 260 may choose to limit the announcements to some or only one of the interfaces. It should be noted that mesh announcement messages are sent in broadcast mode, and receivers of the messages forward the same messages in broadcast mode, as well. Hence, the mesh announcement messages transmitted by MAP GW 260 reach every MAP in the network.

With the "mesh announcement" messages, MAP GW 260 informs the other nodes in the network about its capabilities and non-confidential mesh configuration. Non-confidential mesh configuration comprises at least the following: device capabilities, configuration universally unique identifier (CUUID), GW MAC address on which the mesh network will be established, the list of MAC address of WDS (mesh) peers. In one implementation, a mesh network can be established in the 5 GHz interface, hence MAP GW 260 announces its 5 GHz interface's MAC address as the mesh interface. Likewise, the list of WDS peers is given in terms of the 5 GHz interface MAC addresses of the WDS peers. When MAP GW 260 provides information about its capabilities, it can provide an indication of the protocols that are supported by MAP GW 260, for example, IEEE 802.11 a/b/g/n/ac/ax, an indication of in which frequencies MAP GW 260 can operate, an indication of supported bandwidths, etc. In one implementation, the device capabilities provided in the mesh announcement are the same as the capability information provided in the beacon and probe response messages, in accord with the respective IEEE 802.11 standard supported by the wireless interfaces of the MAP GW 260.

In one implementation, the CUUID is a 24-byte value, 16 bytes of which is used as a network identifier (NI), and 8 bytes of which is used as configuration sequence number (CSN). For a given mesh network, NI is unique and does not change. Two mesh networks that attain different NIs do not establish mesh communication connections between each other. For mesh networks that have the same NI, the CSN designates the freshness of the configuration. If a mesh capable node receives a mesh configuration with a CSN higher than its current CSN, it updates its mesh configuration with the configuration denoted by the latest CSN.

In another implementation, any MAP that is willing to form a mesh connection with MAP GW 260 first needs to establish connection with MAP GW 260 through one of the interfaces, so that it can receive the "mesh announcement" message. For example, MAP node 250 can connect to MAP GW 260 via Ethernet. In such a case, MAP node 260 receives the "mesh announcement" from the Ethernet interface.

In another implementation, a wireless connection between MAP GW 260 and MAP 250 can be established by utilizing the wireless protected system (WPS) protocol. Specifically, standard push button WPS event can be triggered at MAP GW 260 and MAP nodes, yielding an AP-STA connection between MAP GW 260 and the MAP nodes. In particular, a WPS button of MAP GW 260 and a WPS button of MAP 250 can be pressed, triggering a WPS transaction between MAP GW 260 and MAP 250. Note that, in such a scenario, MAP GW 260 is the registrar and MAP 250 is the enrollee, i.e., MAP GW 260 is the node that distributes the credentials, whereas MAP 250 acquires the credentials from the MAP GW 260.

It shall be noted that before the mesh connection is established between MAP GW 260 and MAP 250, the wireless connection formed through the use of a WPS push button event is an AP-STA type of connection. That is to say, MAP 250 connects to MAP GW 260 as a station, but not as an AP. Unless MAP 250 establishes a mesh connection with MAP GW 260, MAP 250 operates as a station wirelessly connected to MAP GW 260. In further implementations, MAP 250 may operate as a UR connected to MAP GW 260, before it establishes a mesh connection with MAP GW 260.

After MAP 250 node has already established a connection with MAP GW 260 through at least one of its interfaces, MAP 250 receives the mesh announcement messages broadcast by MAP GW 260. Furthermore, alternative implementations are possible in which MAP 250 establishes a mesh connection with MAP GW 260 without establishing another connection first. In such instances, MAP 250 sends MAP GW 260 a "join request" message through every one of its communications interfaces in unicast mode. For example, if the MAP 250 is connected to MAP GW 260 through both the Ethernet and the Wi-Fi interfaces, then the MAP 250 sends a "join request" message through the Ethernet and the Wi-Fi interfaces, with the MAC address of MAP GW's 260 respective interface as the destination address.

In response to the "join request" message sent by MAP 250, MAP GW 260 sends the confidential credentials to MAP 250 in an encrypted "join response" message. As noted above, the confidential credentials may include a trusted PIN associated with MAP 250. The confidential credentials provided in the "join response" message are the trusted PIN, SSID and passphrase for some or all interfaces, for example, Wi-Fi 2.4 GHz and 5 GHz interfaces, and PLC interface, if it exists. The join response message is encrypted in order to avoid a security breach that may be encountered due to unencrypted connection between MAP 250 and MAP GW 260. That is to say, even if the connection between MAP 250 and MAP GW 260 is not protected by any encryption method, such as defined in WPA2, or the like, the join response message is encrypted to protect the confidential credentials, most essentially, the trusted PIN.

If the "join response" message is sent on every possible interface between MAP 250 and MAP GW 260, encryption is especially of paramount importance, since it prevents a node attached to the network (through Ethernet) decoding the confidential credentials by eavesdropping the communication between MAP 250 and MAP GW 260. In further implementations, MAP GW 260 may limit the interfaces it transmits the join response message over. For example, MAP GW 260 may choose to utilize only wireless a 5 GHz interface to send the join response message although it has Ethernet and/or other interfaces that can be used to reach MAP GW 260.

As noted above, in some implementations, MAP 250 may connect to MAP GW 260 as a station (for example, a wireless client) and exchange the "join request" and "join response" message over a connection that is established as a result of MAP 250 connection to MAP GW 260 as a station. When MAP 250 is connected to MAP GW 260 as a station, it operates in STA mode, and the connection between MAP 250 and MAP GW 260 is referred to as station-mode connection. When MAP 250 receives the credentials from MAP GW 260 while in STA mode, it changes its mode of operation to AP, and applies the credentials: updates its SSID and passphrase in accordance with the received credentials, creates the WDS connections in accordance with the mesh peers list shared by MAP GW 260, adds these WDS connections to its bridge interface, sets the configuration UUID, and adds vendor information element (IE) to its management packets.

If the mesh connection is established on the 5 GHz wireless interface, both MAP 250 and MAP GW 260 set CCMP (Counter Mode Cipher Block Chaining Message Authentication Code Protocol) key derived from 5 GHz interface's main SSID's passphrase to the WDS connection. After this procedure, MAP GW 260 and the MAP 250 form a mesh network, and wireless communication between MAP 250 and MAP GW 260 is carried out on the WDS connection.

Figure 3A:
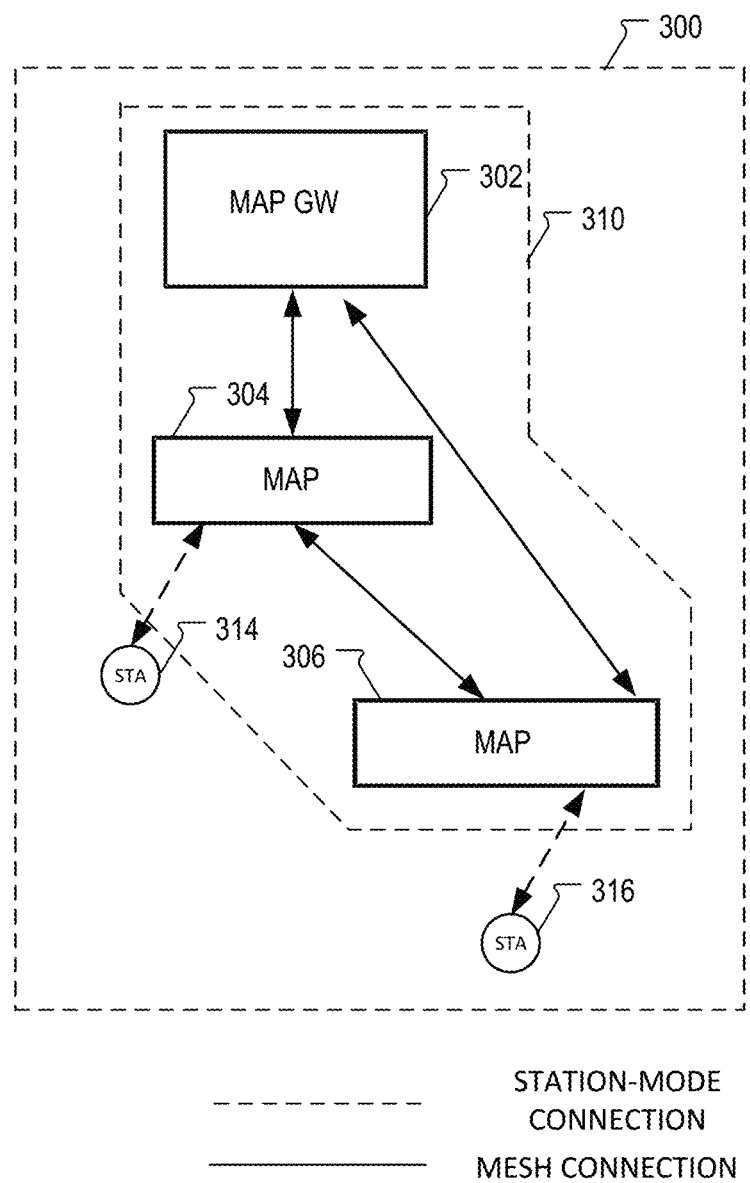
FIG. 3A is a diagram of an example of a communications network, according to aspects of the disclosure.

FIG. 3A is a diagram of an example of a network 300, according to aspects to the disclosure. Network 300 may be any suitable type of network. In some implementations, network 300 may include a wireless network (for example, an 802.11 a/b/g/ac network). Additionally or alternatively, in some implementations, network 300 may include a wired network (for example, an Ethernet network). As illustrated, network 300 may include a mesh capable access point gateway (MAP GW) 302, mesh capable access point (MAP) 304, and MAP 306 that are configured to operate as access points for network 300. Moreover, MAP GW 302, and MAPs 304 and 306 may be connected to one another via mesh connections (for example, WDS links) to form a mesh network 310. Mesh network 310 may be a subnetwork of network 300. In some implementations, mesh network 310 may include only nodes that are configured to operate as access points for network 300. Additionally or alternatively, in some implementations, mesh network 310 may include other nodes in addition to nodes that are configured to operate as access points for network 300.

Network 300 includes stations (STAs) 314 and 316. STA 314 is connected to MAP 304 via a station-mode connection. STA 316 is connected to MAP 306 via a station-mode connection. In other words, stations in network 300 are connected to nodes in the mesh network 310 via station-mode connections, whereas nodes within mesh network 310 are connected via mesh connections. In some implementations, any of the mesh connections may be a WDS connection and/or any other suitable type of connection that would permit MAP 304 to connect to MAP 306 and perform at least some of the routing functions described throughout the specification. The present disclosure is not limited to any specific type of protocol for establishing the mesh-connections. Furthermore, although in the present example the network 310 is a mesh network, alternative implementations are possible in which the network 310 has any other suitable type of topology. The present disclosure is thus not limited to any specific topology for the network 310.

FIG. 3B is a sequence diagram of an example of a process 350 performed by MAP GW 302 and MAP 304 when the mesh connection connecting MAP GW 302 and MAP 304 is established.

At step 351, MAP 304 establishes a wireless station-mode connection with MAP GW 302 through any of its interfaces, such as the Ethernet, PLC or Wi-Fi interfaces. It shall be noted that for MAP 304 to establish a wireless station-mode connection with MAP GW 302, it may first associate with MAP GW 302 as a station node. For this, the MAP 304 can utilize various methods. For example, MAP 304 can associate with MAP GW 302 or any of the MAPs (for example, MAP 306) by the WPS push button method. Specifically, once the WPS buttons of MAP 304 and MAP GW 302 are pressed, a WPS transaction is initiated between these two nodes. At the end of the transaction, MAP 304 establishes a station-mode connection to MAP GW 302. When MAP 304 operates as a STA connected to MAP GW 302, it is said to operate in STA mode (e.g., IEEE 802.11 STA mode).

At step 352, MAP 304 receives a "mesh announcement" message that is transmitted by MAP GW 302. In some implementations, the "mesh announcement" message may include a CCUID corresponding to the mesh network 310. As noted above, the CUUID may be a 24-byte value, 16 bytes of which are used to represent a network identifier (NI) corresponding to the mesh network 310, and 8 bytes used to represent a configuration sequence number (CSN) identifying configuration of the mesh network 310.

At step 353, upon reception of the "mesh announcement" message, MAP 304 sends a "join request" message to MAP 302. This "join request" message is unicast, and it may include a destination address field set to the MAC address of MAP GW 302, a source address field set to the MAC address of MAP 304, and a sender/transmitter address fields that are both set to MAP's 304 MAC address.

At step 354, upon reception of the "join request" message transmitted by MAP 304, MAP GW 302 sends the confidential credentials for network 300 to MAP 304 via an encrypted "join response" message. As noted above, the confidential credentials may include a trusted PIN for connecting to the mesh network 310 and/or one or more nodes in the mesh network 310.

At step 355, following reception of the "join response" message, MAP 304 applies the configuration parameters, and sets up a mesh connection (for example, a WDS connection) with MAP GW 302, as well as additional mesh connections (for example, WDS connections) with other MAPs that are part of mesh network 310 (for example, mesh peers), such as MAP 306, provided that MAP 306 is already connected. In some implementations, any of the mesh connections may be a one-hop data-link layer connection. After the mesh connection(s) are established, MAP 302 may transition into AP mode (e.g., IEEE 802.11 AP mode) and begin operating as an AP for the network 300.

In some implementations, the station-mode connection established at step 351 may be terminated after the establishment of one or more mesh connections at step 355. In such instances, MAP 302 may exit STA mode and begin operating in AP mode. Alternatively, in some implementations, the station-mode connection established at step 351 may be maintained after the establishment of one or more mesh connections at step 355. In such instances, MAP 302 may operate in both STA mode and AP mode at the same time. As can be readily appreciated, while MAP 302 operates in both AP mode and STA mode, the station-mode connection may be used for the transmission of data, received from a STA connected to the network 300 via MAP 302 (e.g., STA 314 shown in FIG. 4), towards MAP GW 302 and/or a node in the network 320. Additionally or alternatively, while MAP 302 operates in both AP mode and STA mode, the station-mode connection may be used for the receipt of data that is directed to the STA.

Figure 4:
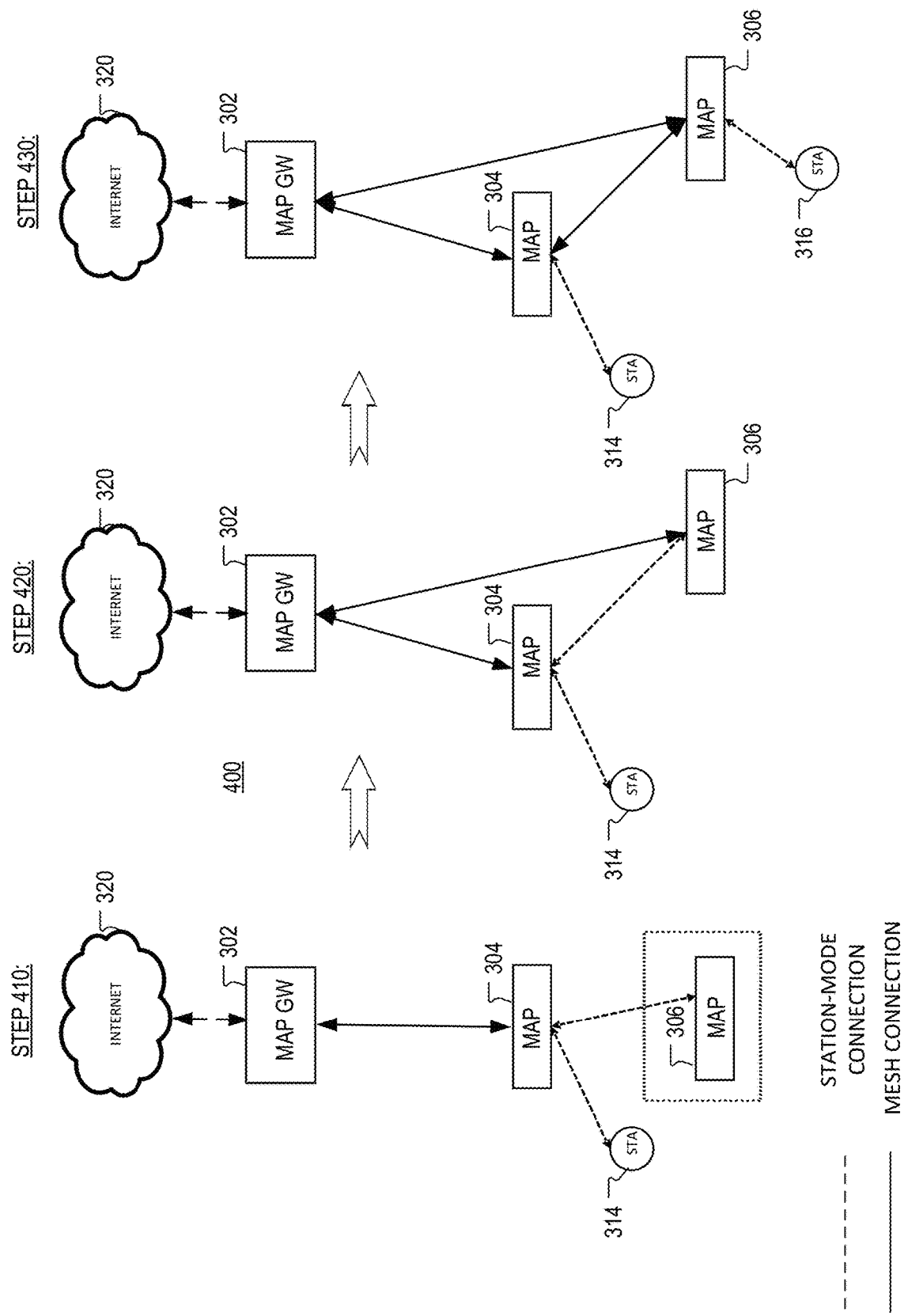
FIG. 4 is a diagram illustrating an example of a process, according to aspects of the disclosure.

FIG. 4 is a diagram of an example of a process 400 for adding additional nodes to network 300, according to aspects of the disclosure. At step 410, MAP 306 connects to network 300 as a station by establishing a station-mode connection with MAP 304. For example, when the station-mode connection is an IEEE 802.11ac connection, MAP 306 may connect to MAP 304 in the same way any device might connect to a home wireless router or commercial access point. In some implementations, the station-mode connection may be a direct connection between MAP 306 and MAP 304 (e.g., a one-hop data link layer connection). When MAP 306 is connected to network 300 as a station, it is said to operate in station (STA) mode (e.g., IEEE 802.11 station mode). When operating in STA mode, MAP 306 may be an end-node (or a leaf) in the graph defined by network's 300 topology.

At step 420, one or more mesh connections (for example, WDS connections) are established between MAP 306 and nodes in mesh network 310. The mesh connections may be established in accordance with the process discussed with respect to FIG. 3B. In some implementations, one or more of the mesh connections may be one-hop data-link layer connections. More particularly, MAP 306 may receive a "mesh announcement" message transmitted by MAP GW 302 (or another node in network 300) over the station-mode connection, and transmit a "join request" message in response. Afterwards, MAP 306 may receive a "join response" message from MAP GW 302 (or another node in mesh network 310), which contains configuration parameters for establishing a mesh connection (for example, a WDS connection) with MAP GW 302. The configuration parameters may also be used to establish a mesh connection with other nodes in mesh network 310 (for example MAP 304). The other nodes in mesh network 310 may be identified by MAP 306 based on a peer list that is provided to MAP 306 by MAP GW 302. The peer list may identify one or more devices that are part of mesh network 310, and it may include an identifier (for example, an address, such as a MAC address) corresponding to at least one respective communications interface of each of the devices that are currently part of mesh network 310 when step 420 is executed.

It should be noted that before setting up the mesh connections, MAP 306 is connected only to MAP node 304, and it is connected to MAP GW 302 via MAP 304. However, after it successfully sets up its mesh connections (for example, WDS connections), it becomes part of mesh network 310, and so it attains a direct mesh connection (for example, a WDS connection) to MAP GW 302. This direct mesh connection (for example, WDS connection) to MAP GW 302 provides an alternative path to MAP GW 302, which would not be an option if MAP 306 stayed connected to MAP 304 in STA or UR mode. According to aspects of the disclosure, a direct connection between two devices may be a connection which allows data to travel in one hop between the two devices without passing through any intermediate nodes.

In some aspects, when MAP 306 is connected to mesh network 310 via one or more mesh connections, MAP 306 is said to operate in AP mode (e.g., IEEE 802.11 AP mode). When operating in AP mode, MAP 306 may be an intermediate node in the graph defined by network's 300 topology. As such, when operating in AP mode, MAP 306 may lie on any network path connecting MAP GW 302 to another node in network 300 (for example, STA 316). Furthermore, when operating in AP mode, MAP 306 may operate as an access point for the network 300.

At step 430, STA 316 connects to network 300 via MAP 306. After connecting to network 300, STA 316 may transmit a message (or data) to a destination located outside network 300 via MAP GW 302 and MAPs 304 and 306. MAP 306 may receive the message and route it to MAP 304. Upon receiving the message from MAP 306, MAP 304 may forward the message to MAP GW 302. Upon receiving the message, MAP GW 302 may further forward the message to a node that is located outside of network 300. For example, MAP GW 302 may transmit the message to a node located in network 320. Network 320 may be the Internet and/or any other suitable type of network, such as a wide area network.

According to aspects of the disclosure, the configuration of the mesh network 310 may change during its operation. For example, the user may change the SSID and/or the passphrase of the network 300, or the user may change the operating channel of the Wi-Fi interfaces, or the user may even replace MAP GW 302 with another gateway node. For the cases that necessitate mesh configuration updates, examples of methods to maintain the connectivity in the mesh network 310 are disclosed further below.

According to aspects of the disclosure, due to government regulations, an AP operating in radar channels have to be able to detect radar with at least a given probability, and in case of detection, change its operating channel and not return to its previous operating channel for a time duration designated by the regulation. This is called dynamic frequency selection (DFS); the channels in which radar detection capability is required are called DFS channels, and the other available channels are called non-DFS channels. The local authorities govern the regulations for devices operating in 5 GHz band, for example, ETSI in Europe and FCC in the USA. For example, according to ETSI, channels that fall within 5150-5250 MHz are called non-DFS channels, whereas channels that fall within 5250-5350 MHz and 5490-5725 MHz are called DFS channels. In cases where the mesh network is operating in a DFS channel of the 5 GHz band (i.e., mesh connections are on the 5 GHz DFS channel), if a MAP node detects radar, it notifies the gateway node about the presence of radar. Note that due to regulations, the node that detects radar has to cease transmission in that DFS channel within a predetermined time period, and then switches to a radar-free channel. An AP is allowed to make transmissions only in a fraction of the allowed time period before ceasing its transmissions in the DFS channel following detection of radar.

Figure 5:
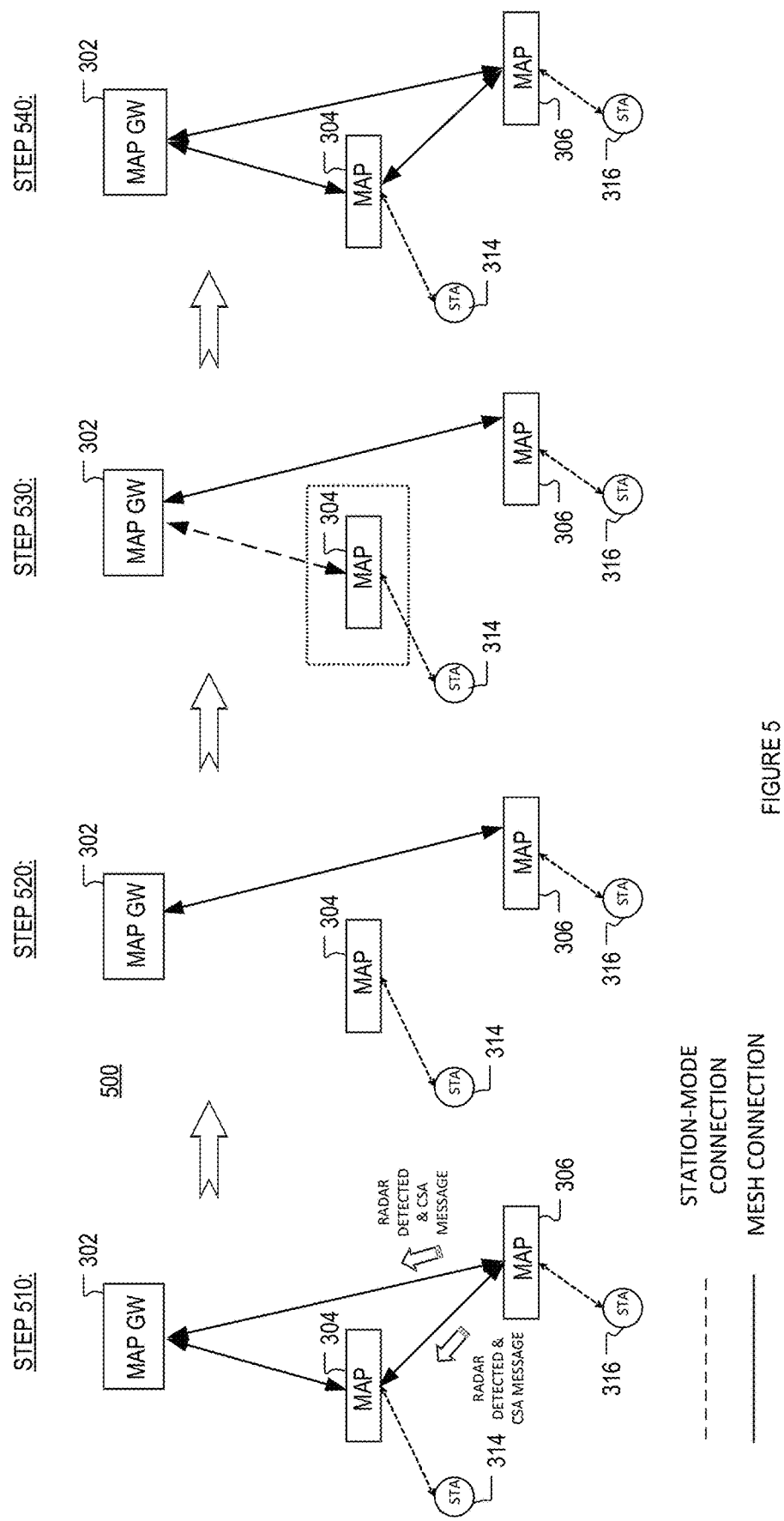
FIG. 5 is a diagram illustrating an example of a process, according to aspects of the disclosure.

FIG. 5 is a diagram illustrating an example of a process 500 for changing a channel used by network 300 in response to detecting that the channel is being used by one or more systems (for example, radar systems) that have a higher priority to use the channel than the devices in network 300.

At step 510, network 300 is operating in a current channel (for example, channel 100), and MAP 306 detects that the current channel is used by a radar. In response to detecting the presence of the radar, MAP 306 sends two messages to its mesh peers: (i) a channel switch announcement (CSA) message designating a candidate channel to switch to is sent to every node in network 300, including MAP GW 302, MAP 306, and the station nodes, and (ii) radar-detected message is broadcasted to every MAP (for example, MAP 304) in the mesh network 310, and MAP GW 302. If the nodes (for example, MAP GW 302 and MAP 304) successfully receive the CSA message, then the network switches to the channel designated in the CSA message; thus re-setting up the WDS connections in the switched channel. However, if the CSA messages were not delivered successfully, the nodes that couldn't receive the CSA would not be able to switch to the designated channel. In one implementation, the radar-detected message includes an indication of an alternative channel to switch to, or a list of alternative channels to switch to. In another implementation, the radar-detected message may only be used to notify the other MAPs in network 300 (for example, MAP 304) or MAP GW 302 that the current channel is being used by a higher-priority system, without dictating or suggesting an alternative channel.

In further implementations, Extended Channel Switch Announcement (ECSA) may be used instead of CSA.

At step 520, MAP GW 302 receives the CSA message successfully, but MAP 304 does not. Afterwards, MAP GW 302 and MAP 306 switch to using the alternative channel designated in the CSA message. However, because MAP 304 has not received the CSA message, it continues operating in the same channel. As a result, the mesh connection between MAP 304 and MAP GW 302 is lost, and the mesh connection between MAP 304 and MAP 306 is also lost. MAP 304 recognizes that it has lost its mesh connections, since it cannot receive periodic "mesh announcement" messages through the mesh connections. It shall be noted that if MAP 304 and MAP GW 302 are connected through another interface, for example an Ethernet interface, then MAP 304 can learn about the updated channel information via a "mesh announcement" message received over the other interface. However, if the only connection option between the MAP and the gateway is the mesh connection that was lost, then with the channel switch of MAP GW 302, MAP 304 loses its connection to MAP GW 302.

At step 530, when MAP 304 loses its connection to MAP GW 302, it reverts back to STA mode, and scans available channels to find the MAC address of MAP GW 302 which is already known to the MAP 304. The scan can be a passive scan (meaning that the scanning node listens to messages, for example, beacons), an active scan (meaning that the scanning node sends probe request messages to the broadcast address or to the previously known MAC addresses), or a combination of both.

At step 540, MAP 304 reconnects to mesh network 310 and reestablishes the mesh connections with MAP 306 and MAP GW 304 that were lost when MAP 306 and MAP 304 changed channels. More particularly, once MAP GW 302 is found, MAP 304 switches to AP mode, and changes its operating channel to the one MAP GW 302 and MAP 304 are found in.

The procedure explained above is followed also in the case when MAP GW 302 does not receive the CSA message but it successfully receives the radar-detected message, in which case the MAP GW 302 changes its operating channel. MAP GW 302 sends the mesh announcements in the newly switched channel, with the updated channel information, and with an incremented CSN. If MAPs 304 and 306 successfully receive the CSA message, then mesh network 310 switches to the channel designated in the CSA message; thus re-setting up the WDS connections in the switched channel.

Figure 6:
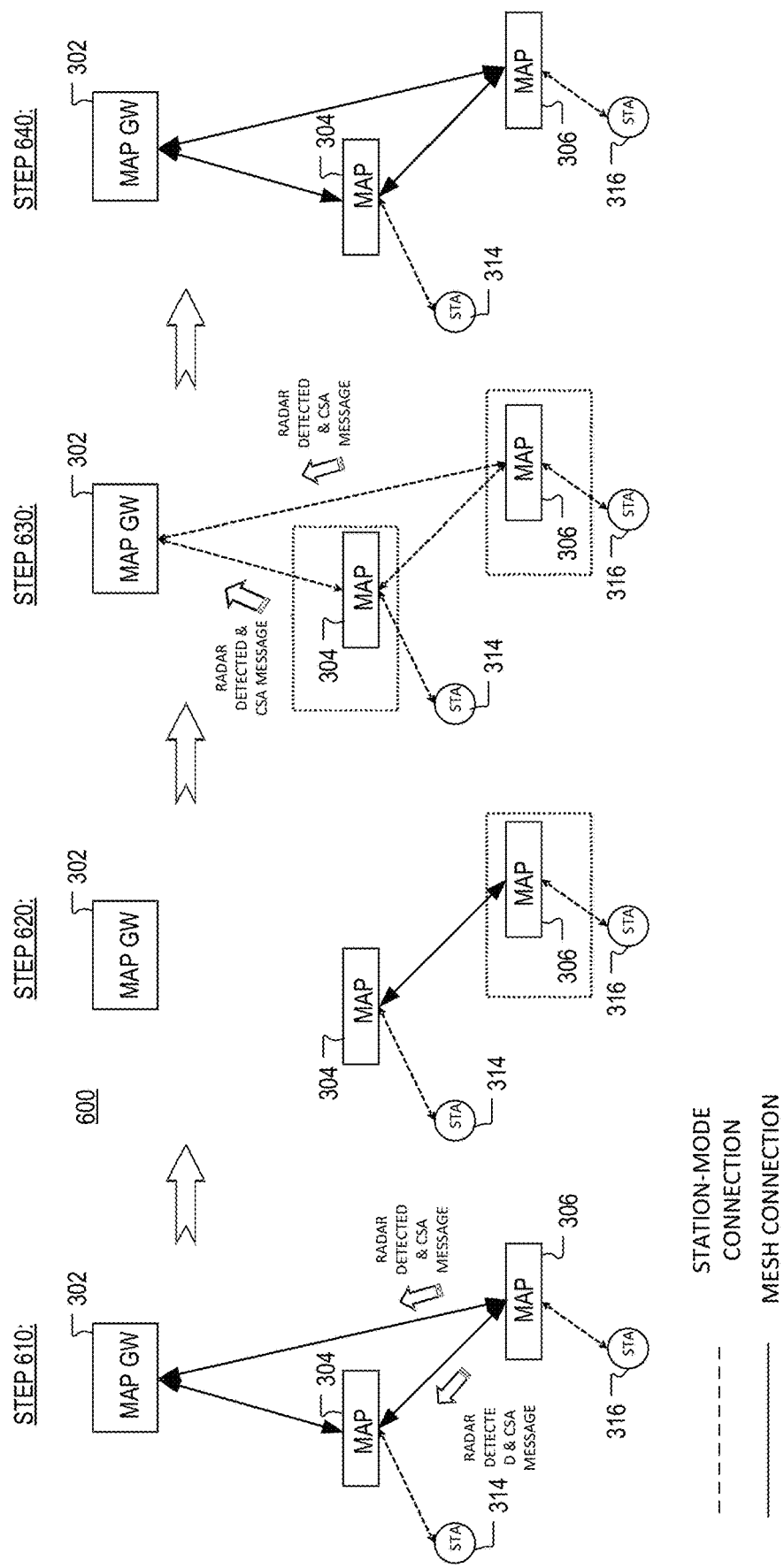
FIG. 6 is a diagram illustrating an example of a process, according to aspects of the disclosure.

FIG. 6 is a diagram illustrating an example of a process 600 for changing a channel used by network 300 in response to detecting that the channel is being used by one or more systems (for example, radar systems) that have a higher priority to use the channel than the devices in network 300. In both of process 500 and process 600, MAP 306 detects that the current channel occupied by mesh network 310 is being used by one or more systems that have a higher priority to use the channel and transmits CSA and radar-detected messages, in response. However, unlike process 500, in process 600, the CSA and/or radar-detected messages fail to be delivered to MAP GW 302. In this regard, process 600 illustrates steps performed by mesh network 310 when MAP GW 302 fails to receive the CSA and/or radar-detected messages that are transmitted by a MAP node in the network.

At step 610, MAP 306 detects that the first channel is used by a radar. In response to detecting the presence of the radar, MAP 306 transmits (for example, broadcasts) two messages to its mesh peers: (i) a CSA message designating a candidate channel to switch to is sent to every node in mesh network 300, including MAP GW 302, MAP 304, and the station nodes, and (ii) a radar-detected message is broadcasted to every MAP (for example, MAP 304) in the mesh network 310, and MAP GW 302.

At step 620, MAP 304 receives the CSA message and/or radar-detected message that are transmitted at step 610. However, MAP GW 302 fails to receive the CSA message and radar-detected message that are transmitted at step 610. As a result, MAPs 304 and 306 switch to using the alternative channel that is designated in the CSA and/or radar-detected message, while the MAP GW 302 fails to do so.

At step 630, following the switch to the designated channel, MAPs 304 and 306 detect that they have lost their respective mesh connections to MAP GW 302, and transition back to STA mode. MAPs 304 and 306 establish respective station-mode connections with MAP GW 302, and re-transmit the CSA and/or radar detected message, which includes an indication of the alternative channel. Upon receiving one or more of the messages, MAP GW 302 switches to using the alternative channel.

At step 640, the MAPs 304 and 306 reconnect to mesh network 310 at the alternative channel and re-establish the mesh connections that are lost at step 630. As discussed above with respect to FIG. 3B, to reconnect to mesh network 310, each of MAP 304 and MAP 306 may perform a handshake with MAP GW 302 which involves the exchange of "join request" and "join response" messages.

Figure 7:
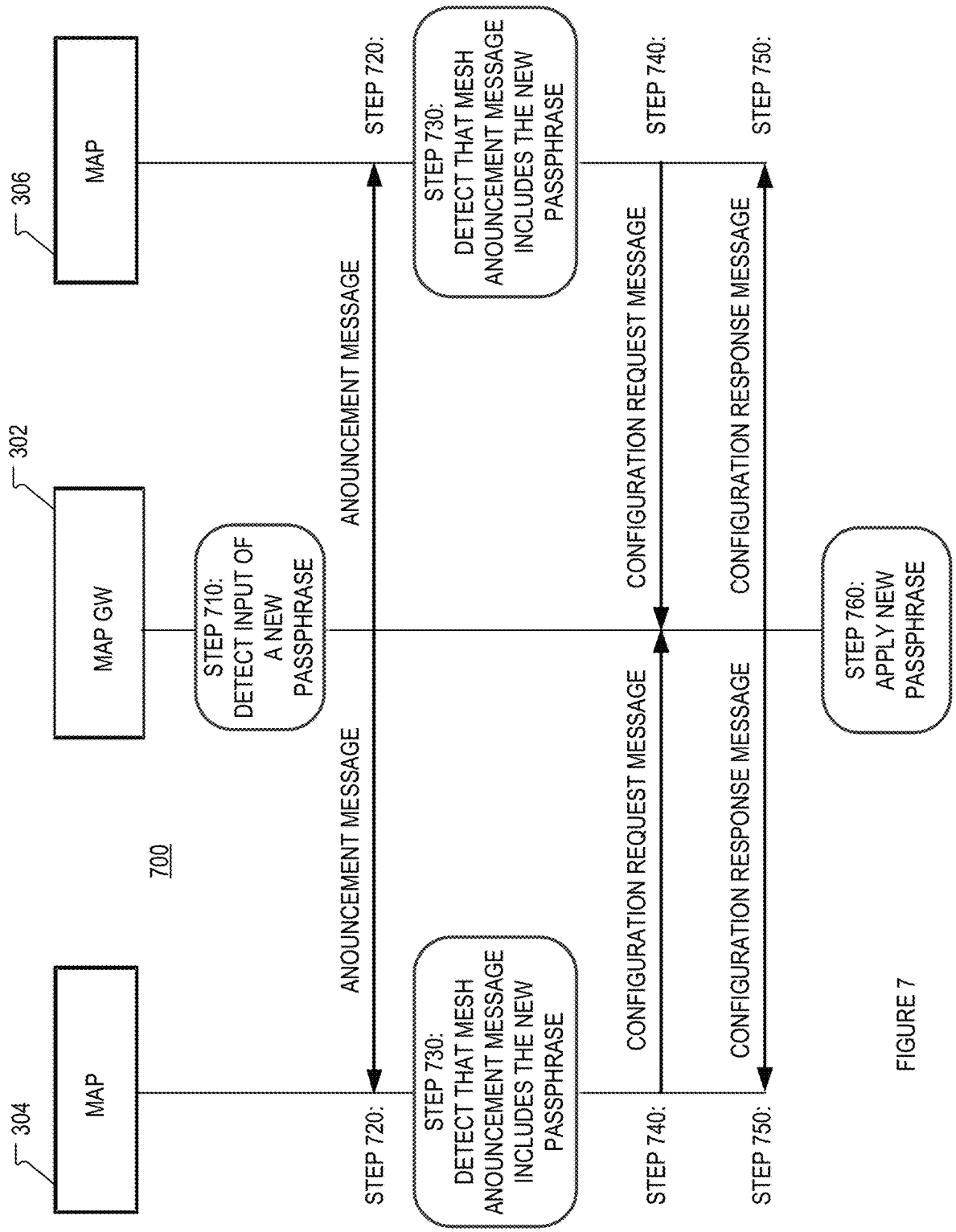
FIG. 7 is a sequence diagram of an example of a process, according to aspects of the disclosure.

FIG. 7 is a flowchart of an example of a process 700 for reconfiguring mesh network 310 in response to a change of the passphrase for connecting to MAP GW 302, according to aspects of the disclosure. For the purposes of this example, it will be assumed that the mesh connections between MAP GW 302 and MAPs 304 and 306 are established using a 5 GHz interface that is part of MAP GW 302.

At step 710, MAP GW 302 detects a re-configuration event specifying a new passphrase for the wireless 5 GHz interface passphrase. The event may be detected in response to MAP GW 302 receiving a user input specifying the new passphrase. When the wireless 5 GHz interface passphrase is changed at MAP GW 302, a key (for example, WDS key) used for the establishment of the mesh connections between MAP GW 302 and MAPs 304 and 306 needs to be updated too because it is derived from the updated passphrase. In one implementation, the key is always derived from the primary SSID's passphrase, and hence, when the primary SSID's passphrase is changed, the key is automatically changed. In another implementation, the key may be derived and set once, and it is not updated when the 5 GHz interface's primary SSID's passphrase is changed. In further implementations, the key (for example, WDS key) may be derived from a separate passphrase dedicated for mesh connections (for example, WDS connections). In the present example, the change of the passphrase requires a key update.

At step 720, MAP GW 302 announces the passphrase update in transmitted "mesh announcement" messages. The "mesh announcement" messages need not state that the passphrase is to be updated or they need not specify which parameter is to be updated, but by using an incremented CSN in the "mesh announcement" message, MAP GW 302 informs its mesh peers (for example, MAPs 304 and 306) about a configuration update.

At step 730, MAPs 304 and 306 receive one or more of the "mesh announcement" messages and detect that the primary SSID passphrase has changed.

At step 740, in response to detecting that the passphrase has changed, MAPs 304 and 306 request the updated configuration from MAP GW 302 by sending an encrypted configuration-request message. In one implementation, each configuration-request message includes an identification of the current configuration of the MAP which has transmitted the configuration-request message.

At step 750, in response to the configuration-request messages sent by MAP 304 and 306, MAP GW 302 sends a respective encrypted configuration-response message to each of MAP 304 and MAP 306. Each respective configuration-response message includes the updated passphrase. In one implementation, each respective configuration-response message incorporates all configuration parameters of MAP GW 302.

At step 760, MAP GW 302 applies the new passphrase. In some implementations, the MAP GW 302 may apply the passphrase only after MAP GW 302 has received a confirmation from every MAP node in mesh network 310 that the configuration-response messages have been received. In one implementation, MAP GW 302 updates the passphrase only after it has received configuration-request message from all active mesh-peers (for example, both MAP 304 and 306 in this example) and it has responded to all active mesh-peers with the configuration-response message. In another implementation, MAP GW 302 waits for a predetermined number of mesh announcements before it applies the passphrase update. For example, in one implementation, MAP GW 302 waits for 5 mesh announcement periods, where each announcement has a period of 1 second. Having received the updated passphrase, the MAPs in mesh network 310 (for example, MAPs 304 and 306) update the WDS keys in accordance with the new passphrase information. After MAP GW 310 applies the new passphrase, all WDS connections become active with the WDS keys derived from the new passphrase.

Figure 8:
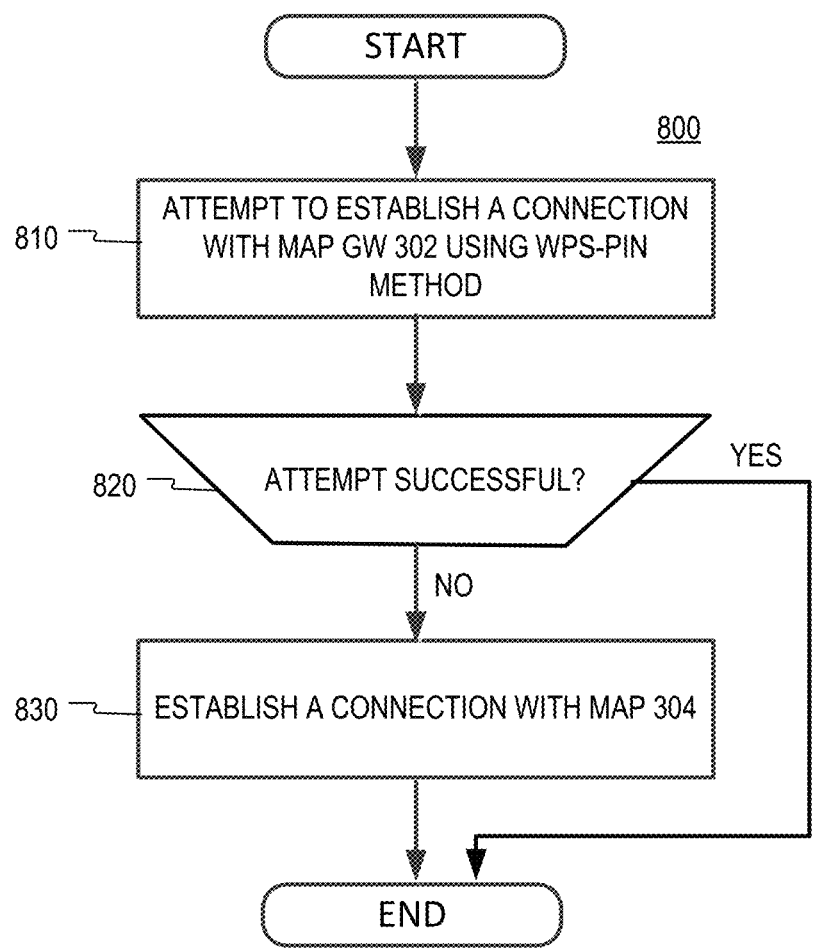
FIG. 8 is a flowchart of an example of a process, according to aspects of the disclosure.

FIG. 8 is a flowchart of an example of a process 800 that is performed by MAP 306 after reboot, according to aspects of the disclosure.

At step 810, after boot-up, MAP 306 (a former peer of a mesh network 310) operates in STA mode and tries to establish a connection with MAP GW 302 via the WPS-PIN method defined in the IEEE 802.11 standard. According to aspects of the disclosure, MAP GW 302 keeps two PINs stored in memory: (1) MAP GW's 302 default PIN, which is used for PIN based WPS connections with non-MAP capable devices, and (2) the trusted PIN, which is used for PIN-based WPS connections with MAP capable devices. When MAP 306 tries to establish connection with MAP GW 302 via the WPS-PIN method using the trusted PIN, MAP GW 302 detects whether the requesting MAP belongs to a WDS peer list that is stored in the memory of MAP GW 302, and which identifies a one or more MAPs, which have been authenticated to establish mesh connections with MAP GW 302. If MAP 302 is not identified in the WDS peer list, then MAP GW 302 does not initiate WPS-PIN method with the trusted PIN. In some implementations, a node that is not identified in the WDS peer list of MAP GW 302 can initiate WPS-PIN with MAP GW's 302 default PIN. On the other hand, if MAP 306 is identified in the mesh peer list, a mesh connection between MAP 306 and other nodes in mesh network (for example, MAP 304) can be established.

At step 820, MAP 306 detects whether the attempt to establish a WPS-PIN connection with MAP GW 302 has been successful. If the attempt has been successful, the process ends. Otherwise, if the attempt is unsuccessful, the process proceeds to step 830.

At step 830, if MAP 306 does not have direct connection with MAP GW 302, it establishes connection to MAP 304.

MAP 306 uses the trusted PIN that it acquired during its initial connection with MAP GW 302, for establishing a PIN based station-mode connection with MAP 304. After MAP 306 establishes a STA station-mode connection with MAP 304 (or another MAP), it receives one or more "mesh announcement" messages via station-mode connection with MAP 304 and uses those "mesh announcement" messages to establish a mesh connection with MAP GW 302 and/or MAP 304.

In some implementations, if MAP 306 node is connected to the MAP GW 302 through an Ethernet connection, it receives the "mesh announcement" messages via the Ethernet connection. In instances, in which MAP 306 is connected to MAP GW 302 via an Ethernet connection, MAP 306 need not use the WPS-PIN method defined in the IEEE 802.11 standard to establish a station-mode connection with MAP GW 302

Figure 9:
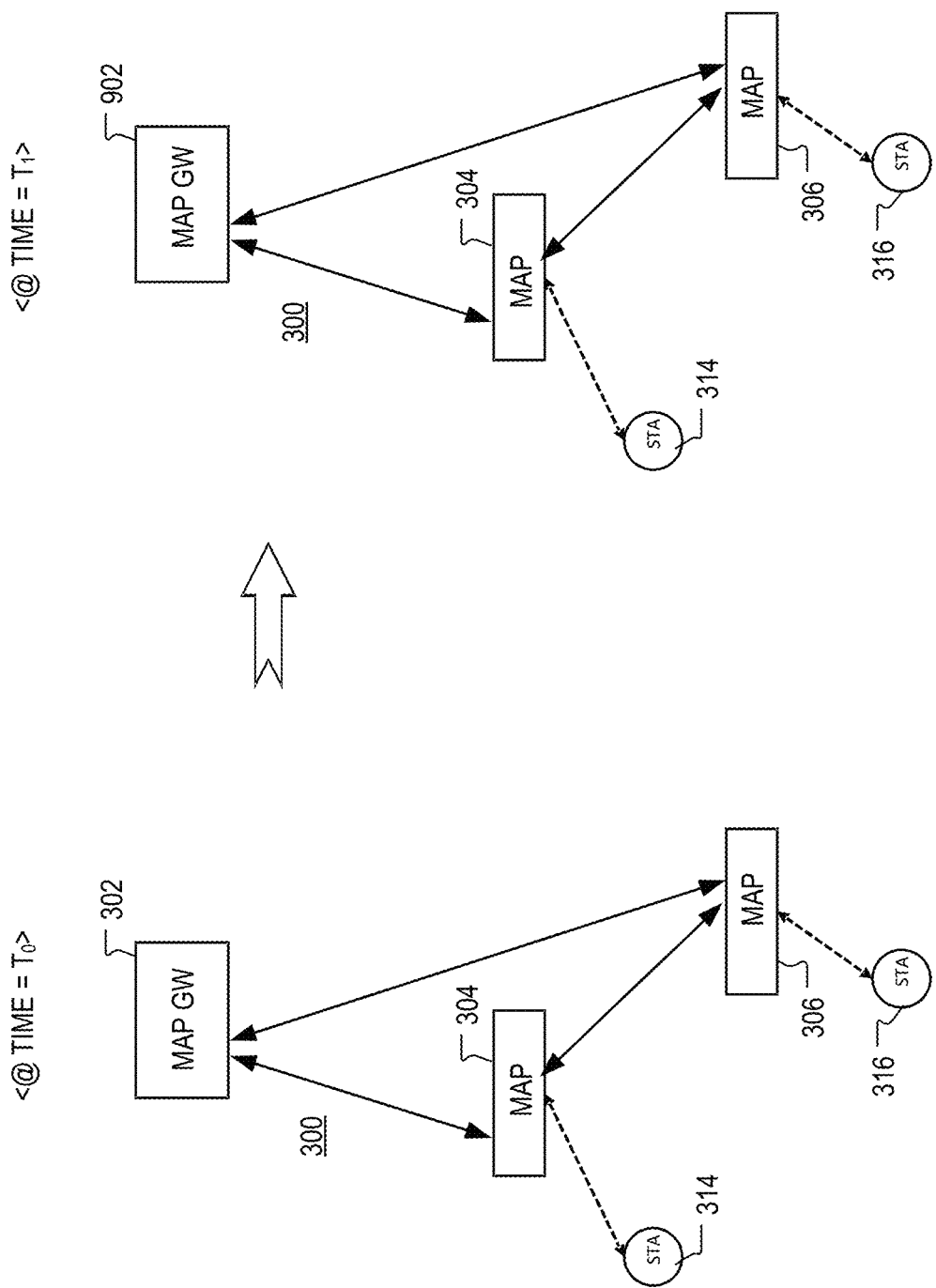
FIG. 9 is a diagram illustrating the network of FIG. 3A before and after a gateway in the network is replaced, according to aspects of the disclosure.

FIG. 9 is a diagram of the network 300 illustrating an example in which the gateway node is replaced, according to aspects of the disclosure. As illustrated, at time $t_0$, MAP GW 302 is the gateway node in network 300, and MAPs 304 and 306 are connected to MAP GW 302, as shown. At time $t_1$, MAP GW 302 is replaced with MAP GW 902, and MAPs 304 and 306 are connected to MAP GW 902 via new mesh connections.

Figure 10:
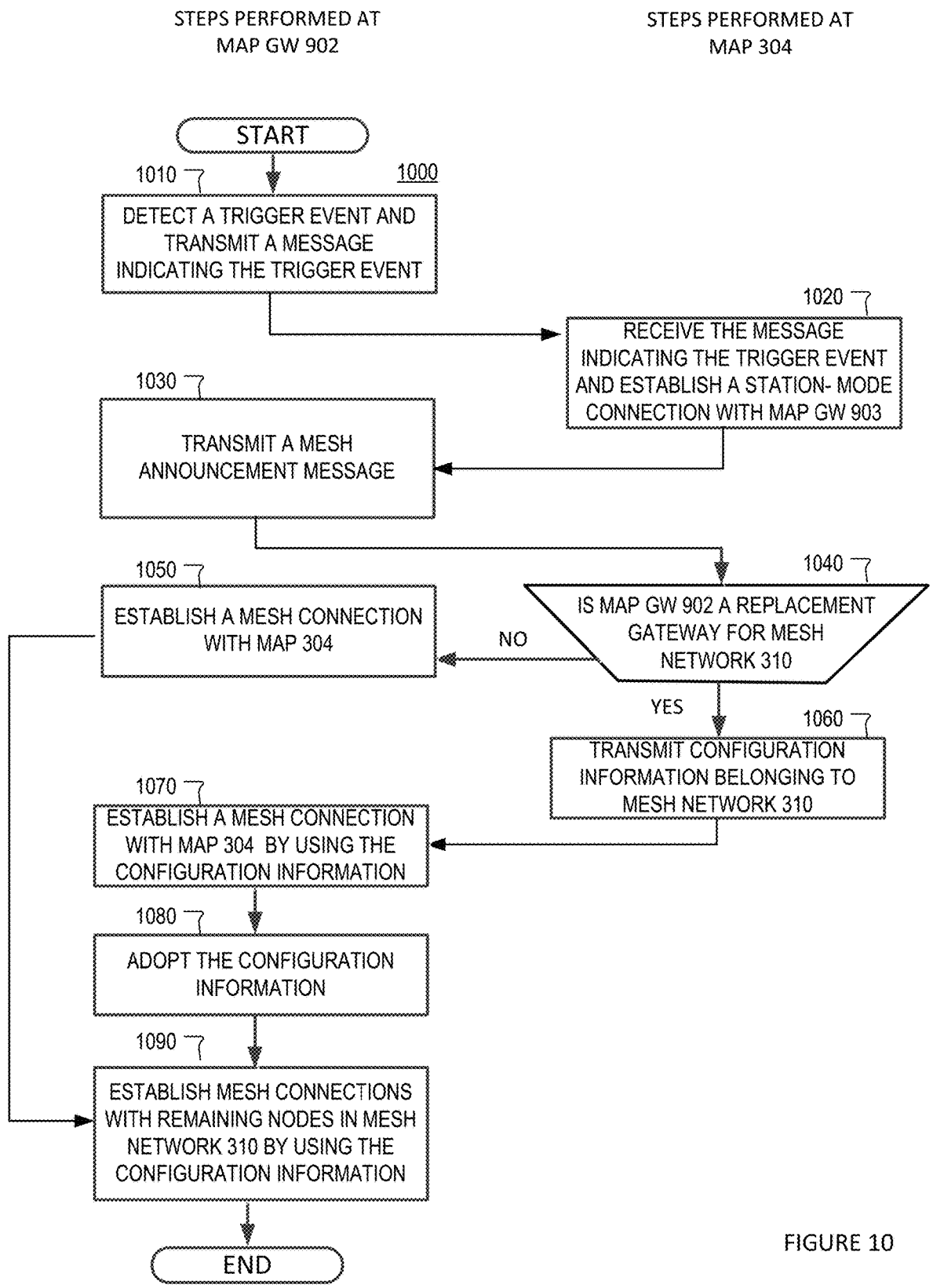
FIG. 10 is a flowchart of an example of a process, according to aspects of the disclosure.

FIG. 10 is a flowchart of an example of a process 1000 for incorporating MAP GW 902 into mesh network 310 after MAP GW 302 has been replaced with MAP GW 902. At step 1010, MAP GW 902 detects a trigger event and transmits a message containing an indication of the trigger event. Because MAP GW 902 has no prior connection with mesh network 310, it requires a trigger event to initiate a connection. This trigger event may be a WPS push button event, which can be realized by pushing the WPS buttons on MAP GW 902 and MAP 304, or this trigger event may be another event initiated through the user interface of MAP GW 902, or this trigger event may be generated using a user application running on a smart phone or tablet, etc., which can send a trigger event command to any of MAP GW 902 and MAPS 304 and 306 for starting a WPS transaction.

At step 1020, MAP 304 receives the message containing the indication of the trigger event and establishes a station-mode connection with MAP GW 902, while also transitioning from AP mode into STA mode. At step 1030, MAP GW 902 transmits a "mesh announcement" message including a first CUUID, and in particular a first NI (which is part of the first CUUID) that is different from a second NI that was associated with mesh network 310 while MAP GW 302 was part of it.

At step 1040, MAP 304 detects whether MAP GW 902 is a replacement gateway. According to aspects of the disclosure, a "replacement gateway" may include a gateway that has never been part of a mesh network before, or one which has been reset to delete some or all information that is associated with a mesh network which the gateway has been part of.

In some implementations, MAP 304 may detect that MAP GW 902 is a replacement gateway by comparing the first NI that is contained in the "mesh announcement" message to the second NI, which is stored in the memory of MAP 304 (and was previously used by MAP GW 302 to identify mesh network 310). As noted above, the second NI is associated with mesh network 310, and MAP GW 302, in particular. When the first NI and the second NI do not match, MAP 304 deduces from the NI that the source of the "mesh announcement" message (i.e., MAP GW 902) is a replacement GW.

Furthermore, MAP 304 may determine that MAP GW 302 is a replacement gateway when the "mesh announcement" message does not include a mesh peer list that identifies a prior mesh configuration with other MAPs. The mesh peer list, as discussed above, may include a list of MAPs which have been previously connected to MAP GW 902 (and/or mesh network 310) via mesh connections. Thus, when the "mesh announcement" message does not include a WDS peer list, MAP 304 may again deduce that MAP GW 902 is a replacement gateway because no MAP nodes have been previously connected to it.

When MAP 304 detects that MAP GW 902 is not a replacement gateway, the process proceeds to step 1050. At step 1050, MAP 304 transmits a first "join request" to MAP GW 902, MAP GW 902 responds with a "join response" message to MAP 304, and a mesh connection is established between MAP 304 and MAP GW 902, in the manner discussed with respect to FIG. 3B.

When MAP 304 detects that MAP GW 902 is a replacement GW, the process proceeds to step 1060. At step 1060, MAP GW 902 delivers its mesh configuration, namely its peer list (for example, WDS peer list corresponding to mesh network 310), to MAP GW 902. More particularly, at step 1060, MAP 304 sends a second "join request" message to MAP GW 902 within which it incorporates the mesh configuration (for example, the mesh peer list of mesh network 310 and/or the second NI that was used by MAP GW 302 to identify mesh network 310). Unlike the first "join request" message, the second "join request" message may include at least one of the second NI of the mesh network 310 and the mesh peer list of the mesh network 310. At step 1070, MAP GW 902 transmits a "join response" message to MAP 304, and a mesh connection is established between MAP 304 and MAP GW 902.

At step 1080, MAP GW 902 adopts the configuration information of mesh network 310. More particularly, MAP GW 902 begins announcing the mesh peer list of mesh network 310 in its "mesh announcement" messages. Furthermore, MAP GW 902 begins making its mesh announcements with the adopted second NI and an incremented CSN. This way, MAPs that have mesh network's 300 NI (for example, the second NI) may receive "mesh announcement" messages through their mesh connections (for example, WDS connections), and update their configurations accordingly.

At step 1090, MAP GW 902 establishes mesh connections with one or more other MAPs (for example, MAP 306) by using the adopted configuration settings of MAP GW 302. When MAP GW 302 is replaced with MAP GW 902, MAP 306 retains the configuration settings of mesh network 310 and performs a scan for the lost GW (i.e., MAP GW 302). Note that when MAP GW 302 is turned off, all MAPs (for example, MAP 306) in mesh network 310 revert to STA mode in an effort to find MAP GW 302. Since MAP GW 302 is turned off, the MAPs (for example, MAP 306) stay in STA mode searching for MAP GW 302. This search is stopped, either when MAP GW 302 is turned on or when the MAPs receive a "mesh announcement" message from a new GW node (for example, MAP GW 902) with the same NI. MAPs in the mesh network 310 (for example, MAP 306) may receive "mesh announcement" messages on the interfaces which connect the MAPs to the gateway node (for example, MAP GW 902) of the mesh network 310. The new gateway node (for example, MAP GW 902) may obtain the interface addresses of MAPs in mesh network 310 (for example, MAP 306) from the peer list transmitted at step 1060. A MAP that has switched to STA mode may receive mesh announcements, for example, if it is connected to MAP GW 902 through Ethernet.

The remaining MAPs in mesh network 310 (for example, MAP 306) and MAP GW 902 establish a mesh network with the confidential credentials of mesh network 310 that are used before MAP GW 302 is replaced with MAP GW 902. In one implementation, MAP GW 902 and the MAPs in mesh network 310 (for example, MAP 306) may adopt and keep mesh network's 310 confidential credentials, such as the SSID, passphrase, trusted PIN. In another implementation, the MAP GW 902 may temporarily use mesh network's 310 confidential credentials to connect to the MAP nodes in the mesh network 310, and it may update these credentials with its default credentials immediately after connecting. MAP GW 902 informs the mesh network of the new confidential credentials by incrementing the CSN. In one implementation, any MAP in mesh network 310 that receives a "mesh announcement" message with a higher CSN than its current CSN state, sends configuration-request message to MAP GW 902. MAP GW 902 responds with the encrypted configuration-response message with the new confidential credentials.

Figure 11:
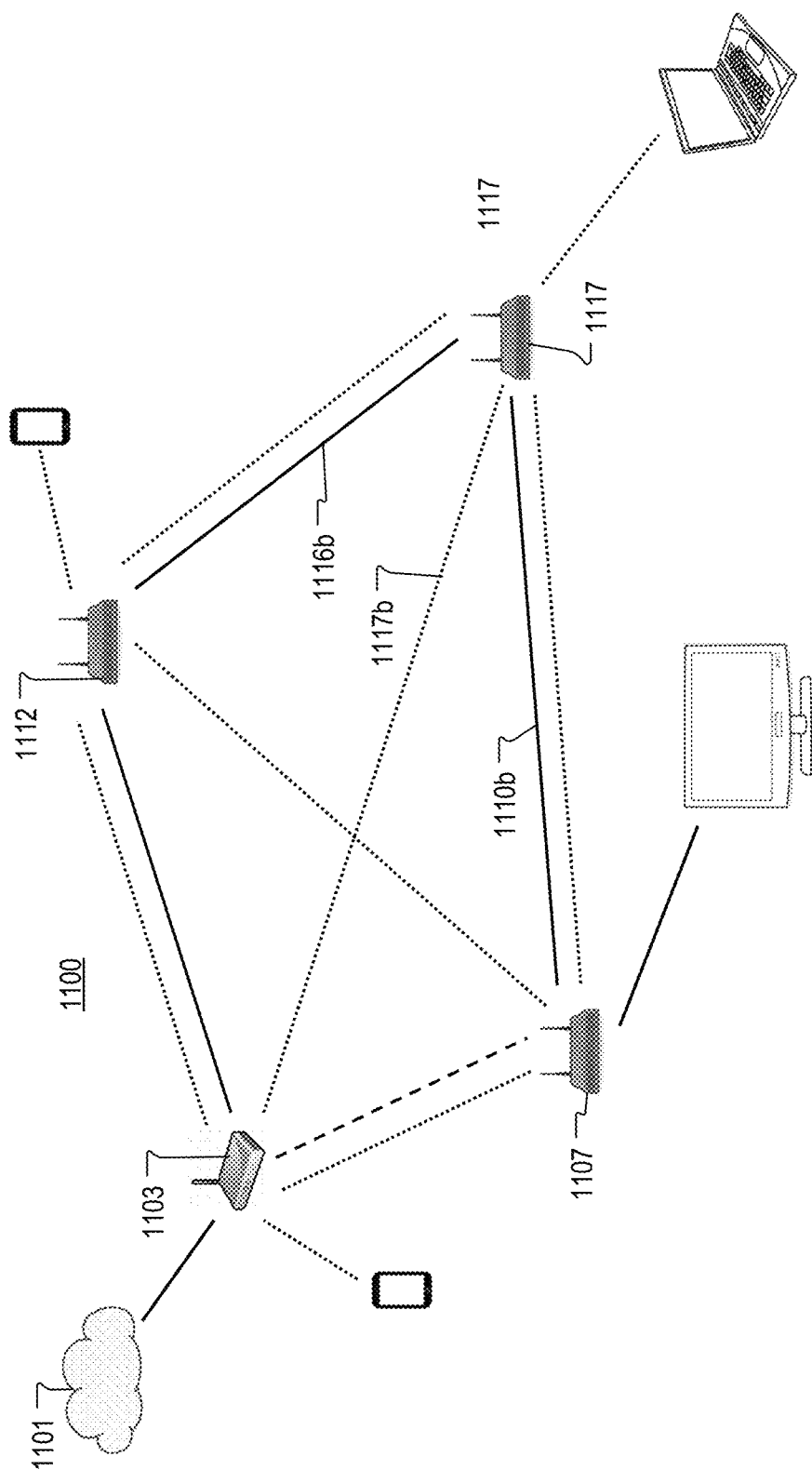
FIG. 11 is a diagram of an example of a communications network, according to aspects of the disclosure.

FIG. 11 depicts an example of a network 1100 in which mesh processor 200 is incorporated in MAP GW 1103, and a hybrid mesh network is setup by using MAPs, 1107, 1112, and 1117. The dashed lines represent Wi-Fi connections, either 2.4 GHz or 5 GHz, and the solid lines represent either Ethernet or PLC. More particularly, connections 1110b and 1116b are PLC connections, connection 1117b is an Ethernet connection, and network 1101 represents the Internet. In accordance with the present example, if the MAPs, 1107, 1112, and 1117 employ a communication technology that is not supported by MAP GW 1103, such as PLC, they can utilize this communication medium for transmission among each other; thus increasing the available capacity beyond the common communication medium. The MAPs, 1107, 1112, and 1117 make use of all available communication media in the hybrid network while creating their forwarding tables, and making routing decisions.

Figure 12:
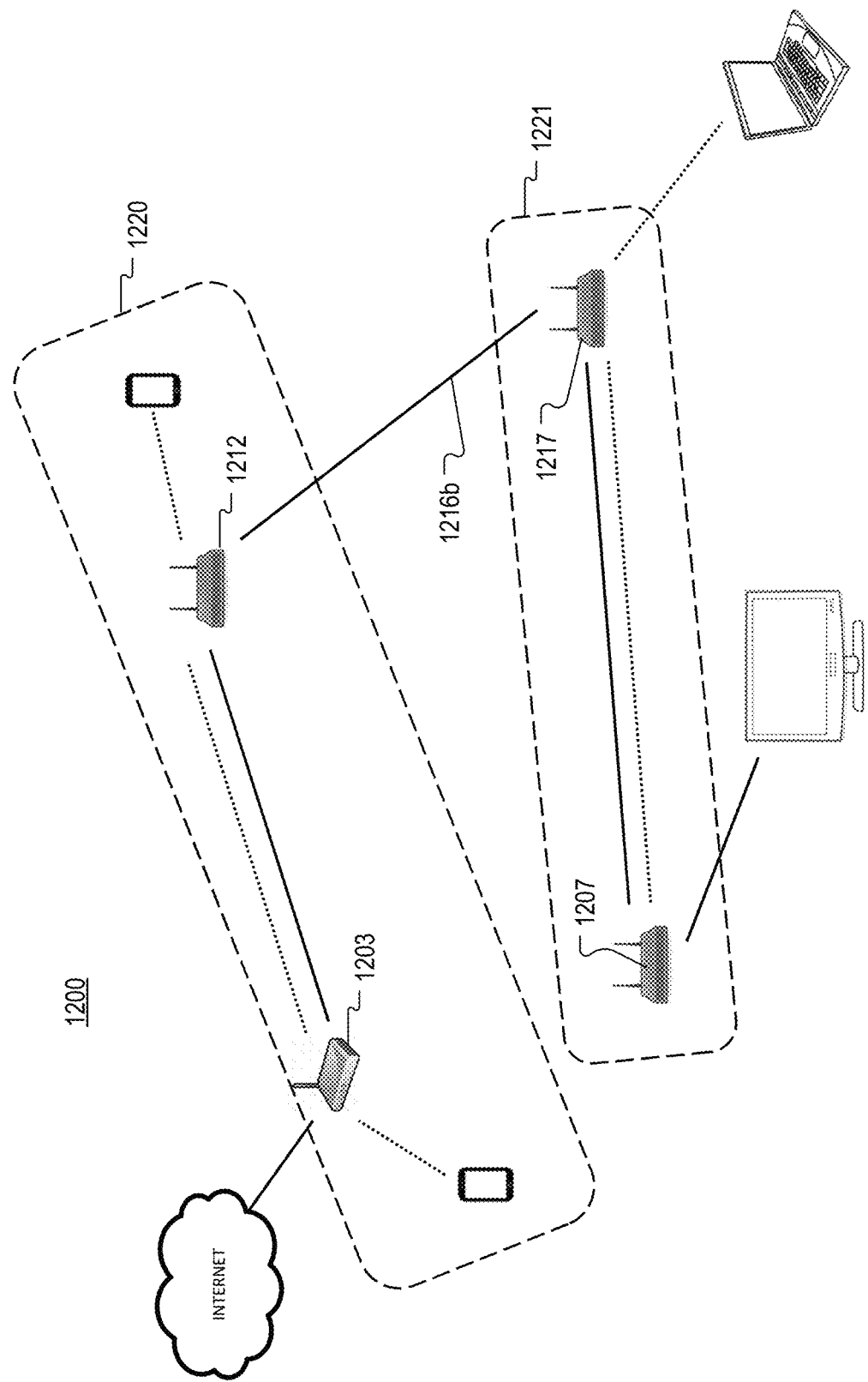
FIG. 12 is a diagram of an example of a communications network, according to aspects of the disclosure.

FIG. 12 depicts an example of a network 1200 which is divided into mesh partitions 1220 and 1221. Partition 1220 comprises MAP GW 1203 and MAP 1212, and partition 1221 comprises MAPs 1207 and 1217. Mesh partitions 1220 and 1221 operate in separate wireless channels; hence the nodes that belong to these partitions do not compete for access to the wireless medium. The communication between the partition 1220 and 1221 is carried out through connection 1216b; thus the hybrid network is still fully connected.

FIGS. 1A-12 are provided as an example only. At least some of the steps described in the examples provided throughout the specification can be performed concurrently, performed in a different order, or altogether omitted. It will be understood that the provision of the examples described herein, as well as clauses phrased as "such as," "for example", "including", "in some aspects," "in some implementations," and the like should not be interpreted as limiting the disclosed subject matter to the specific examples.

Having described the embodiments in detail, those skilled in the art will appreciate that, given the present disclosure, modifications may be made to the embodiments without departing from the spirit of the inventive concepts described herein. Therefore, it is not intended that the scope of the embodiments be limited to the specific implementations illustrated and described.

What is being claimed is:

1. A method performed by a wireless device, the method comprising:

connecting, by the wireless device in station mode, to a gateway device of a wireless local area network (WLAN), wherein the gateway device operates as an access point (AP) and a bridge for the WLAN to a wide area network (WAN);

receiving, by the wireless device in station mode, from the gateway device, a mesh announcement message including a mesh-peer list, wherein the mesh-peer list includes information for pre-establishment of a mesh link;

transmitting, by the wireless device in station mode, to the gateway device, a request message to join a subnetwork, wherein the subnetwork includes the gateway device and a first node that operates as a mesh AP for the WLAN;

receiving, by the wireless device in station mode, from the gateway device, a response message to connect to the subnetwork;

establishing, by the wireless device in station mode, based on the mesh announcement message, a first connection to the first node;

changing, by the wireless device, from station mode to mesh access point mode and operating, with the first node, as another mesh AP for the WLAN, wherein the first connection is a one-hop data-link layer connection;

receiving, by the wireless device in mesh access point mode, data originating from a station (STA) that is connected to the WLAN via the wireless device, wherein the data has a destination outside of the WLAN; and transmitting, by the wireless device in mesh access point mode, the data to the first node to communicate to the gateway device.

2. The method of claim 1, wherein the wireless device wirelessly connects to the gateway device by executing a Wi-Fi Protected Setup (WPS) transaction before the mesh announcement message is received.

3. The method of claim 1, wherein the subnetwork is a mesh network.

4. The method of claim 1, wherein the subnetwork includes a second node configured to operate as an AP for the WLAN and to establish a second connection, wherein the second connection is a one-hop data-link layer connection.

5. The method of claim 4, further comprising:

selecting, by the wireless device in mesh access point mode, the first node over the second node to transmit the data based on a first cost metric associated with the first connection and a second cost metric associated with the second connection.

6. The method of claim 4, further comprising:

re-connecting, by the wireless device in mesh access point mode, to the gateway device in response to detecting that at least one of the first connection and the second connection is interrupted, and receiving from the gateway device a wireless channel identifier; and re-establishing, by the wireless device in mesh access point mode, at least one of the first connection and the second connection based on the wireless channel identifier.

7. The method of claim 1, wherein the mesh announcement message includes an identifier corresponding to the first node, and the first connection to the first node is established based on the identifier.

8. The method of claim 1, wherein the mesh announcement message includes an identifier of a current configuration of the subnetwork.

9. A wireless device comprising:
- a processor configured to connect, in station mode, to a gateway device of a wireless local area network (WLAN), wherein the gateway device operates as an access point (AP) and a bridge for the WLAN to a wide area network (WAN);
- a receiver configured to receive, in station mode, from the gateway device, a mesh announcement message including a mesh-peer list, wherein the mesh-peer list includes information for pre-establishment of a mesh link;
- a transmitter configured to transmit, in station mode, to the gateway device, a request message to join a subnetwork, wherein the subnetwork includes the gateway device and a first node that operates as a mesh AP for the WLAN;
- the receiver is further configured to receive, in station mode, from the gateway device, a response message to connect to the subnetwork;
- the processor is further configured to establish, in station mode, based on the mesh announcement message, a first connection to the first node; the processor is further configured to change from station mode to mesh access point mode and operate, with the first node, as another mesh AP for the WLAN, wherein the first connection is a one-hop data-link layer connection;
- the receiver is further configured to receive, in mesh access point mode, data originating from a station (STA) that is connected to the WLAN via the wireless device, wherein the data has a destination outside of the WLAN; and
- the transmitter is further configured to transmit, in mesh access point mode, the data to the first node to communicate to the gateway device.

10. The wireless device of claim 9, wherein the processor is further configured to execute a Wi-Fi-Protected Setup (WPS) transaction to connect to the gateway device before the mesh announcement message is received.

11. The wireless device of claim 9, wherein the subnetwork is a mesh network.

12. The wireless device of claim 9, wherein the subnetwork includes a second node configured to operate as an AP for the WLAN and to establish a second connection, wherein the second connection is a one-hop data-link layer connection.

13. The wireless device of claim 12, wherein the processor is further configured to select, in mesh access point mode, the first node over the second node to transmit the data based on a first cost metric associated with the first connection and a second cost metric associated with the second connection.

14. The wireless device of claim 12, wherein the processor is further configured to, in mesh access point mode:
- re-connect to the gateway device in response to detecting that at least one of the first connection or the second connection is interrupted;
- receive from the gateway device a wireless channel identifier; and
- re-establish at least one of the first connection and the second connection based on the wireless channel identifier.

15. The wireless device of claim 9, wherein the mesh announcement message includes an identifier corresponding to the first node, and the first connection to the first node is established based on the identifier.

16. The wireless device of claim 9, wherein the mesh announcement message includes an identifier of a current configuration of the subnetwork.

* * * * *